United States Patent
Misra et al.

(10) Patent No.: US 11,609,640 B2
(45) Date of Patent: Mar. 21, 2023

(54) EMOJI USER INTERFACES

(71) Applicant: Apple Inc., Cupertino, CA (US)

(72) Inventors: Karan Misra, Newark, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/353,498

(22) Filed: Jun. 21, 2021

(65) Prior Publication Data

US 2021/0397270 A1  Dec. 23, 2021

Related U.S. Application Data

(60) Provisional application No. 63/041,972, filed on Jun. 21, 2020.

(51) Int. Cl.
| | |
|---|---|
| *G06F 3/048* | (2013.01) |
| *G06F 3/023* | (2006.01) |
| *G06F 3/04817* | (2022.01) |
| *G06F 3/04895* | (2022.01) |
| *H04M 1/72436* | (2021.01) |

(52) U.S. Cl.
CPC ........ *G06F 3/0236* (2013.01); *G06F 3/04817* (2013.01); *G06F 3/04895* (2013.01); *H04M 1/72436* (2021.01)

(58) Field of Classification Search
CPC .............. G06F 3/0236; G06F 3/04817; G06F 3/04895; H04M 1/72436
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,913,176 B1 | 3/2011 | Blattner et al. |
| 7,957,762 B2 | 6/2011 | Herz et al. |
| 8,006,002 B2 | 8/2011 | Kalayjian et al. |
| 8,171,084 B2 | 5/2012 | Walter et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,348,458 B2 | 5/2016 | Hotelling et al. |

(Continued)

FOREIGN PATENT DOCUMENTS

| | | |
|---|---|---|
| WO | 2013/169849 A2 | 11/2013 |
| WO | 2014/105276 A1 | 7/2014 |

OTHER PUBLICATIONS

Lance_ Whitney, How to use Google's Gboard keyboard on iOS or Android devices, 2018, TechRepublic; 10 pages.*

(Continued)

*Primary Examiner* — Linh K Pham
(74) *Attorney, Agent, or Firm* — Kubota & Basol LLP

(57) ABSTRACT

In some embodiments, an electronic device provides efficient user interfaces for searching for and/or entering emojis into a user interface.

18 Claims, 24 Drawing Sheets

(56) References Cited

U.S. PATENT DOCUMENTS

| | | | |
|---|---|---|---|
| 9,933,937 B2 | | 4/2018 | Lemay et al. |
| 10,203,843 B2 * | | 2/2019 | Tobens, III .......... G06F 3/04845 |
| 10,748,322 B1 * | | 8/2020 | Pishevar ................ G06V 10/50 |
| 2002/0015024 A1 | | 2/2002 | Westerman et al. |
| 2005/0190059 A1 | | 9/2005 | Wehrenberg |
| 2006/0017692 A1 | | 1/2006 | Wehrenberg et al. |
| 2006/0033724 A1 | | 2/2006 | Chaudhri et al. |
| 2006/0197753 A1 | | 9/2006 | Hotelling |
| 2007/0276814 A1 | | 11/2007 | Williams |
| 2010/0123724 A1 * | | 5/2010 | Moore ................... G06F 3/0482 |
| | | | 345/173 |
| 2012/0059787 A1 | | 3/2012 | Brown et al. |
| 2012/0179969 A1 | | 7/2012 | Lee et al. |
| 2012/0319985 A1 * | | 12/2012 | Moore ................... G06F 3/0219 |
| | | | 345/173 |
| 2014/0019885 A1 | | 1/2014 | Jung et al. |
| 2015/0100537 A1 * | | 4/2015 | Grieves .................. G06N 5/025 |
| | | | 706/52 |
| 2015/0121300 A1 | | 4/2015 | Wang et al. |
| 2015/0286371 A1 | | 10/2015 | Degani |
| 2015/0331550 A1 | | 11/2015 | Wang et al. |
| 2015/0363091 A1 | | 12/2015 | Lee et al. |
| 2016/0050169 A1 | | 2/2016 | Ben Atar et al. |
| 2016/0259502 A1 | | 9/2016 | Parrott |
| 2017/0060354 A1 | | 3/2017 | Luo et al. |
| 2017/0068439 A1 * | | 3/2017 | Mohseni ............... G06F 3/0482 |
| 2017/0075878 A1 * | | 3/2017 | Jon ....................... G06F 40/279 |
| 2017/0083174 A1 | | 3/2017 | Tobens et al. |
| 2017/0131870 A1 * | | 5/2017 | Harper ............... H04M 1/72436 |
| 2017/0185581 A1 * | | 6/2017 | Bojja ................... G06V 30/40 |
| 2017/0300462 A1 * | | 10/2017 | Cudworth ............ G06F 3/0482 |
| 2017/0308289 A1 * | | 10/2017 | Kim ..................... G06F 3/0237 |
| 2017/0308290 A1 * | | 10/2017 | Patel .................... G06F 16/9535 |
| 2017/0308293 A1 | | 10/2017 | Lee et al. |
| 2017/0336926 A1 * | | 11/2017 | Chaudhri ............ G06F 3/04845 |
| 2017/0336960 A1 * | | 11/2017 | Chaudhri ............ G06F 40/197 |
| 2017/0353842 A1 * | | 12/2017 | Waddell ............ H04M 1/72436 |
| 2017/0358117 A1 | | 12/2017 | Goossens et al. |
| 2018/0039406 A1 * | | 2/2018 | Kong ..................... G06F 9/451 |
| 2018/0047195 A1 | | 2/2018 | Vissicaro et al. |
| 2018/0068475 A1 | | 3/2018 | Blue et al. |
| 2018/0144557 A1 | | 5/2018 | Seo |
| 2018/0173692 A1 * | | 6/2018 | Greenberg .......... G06F 3/04842 |
| 2018/0295072 A1 * | | 10/2018 | Yim ........................ H04L 51/10 |
| 2018/0329622 A1 * | | 11/2018 | Missig ................ G06F 3/04886 |
| 2018/0336184 A1 * | | 11/2018 | Bellegarda ............... G06F 40/30 |
| 2018/0336716 A1 * | | 11/2018 | Ramprashad ........ G06V 40/176 |
| 2018/0348890 A1 * | | 12/2018 | Yang ..................... G06N 20/00 |
| 2019/0018577 A1 | | 1/2019 | Liu |
| 2019/0199663 A1 | | 6/2019 | Liu et al. |
| 2019/0199848 A1 * | | 6/2019 | Moore ................ H04M 1/7243 |
| 2019/0250934 A1 * | | 8/2019 | Kim ....................... G06V 40/28 |
| 2019/0260702 A1 | | 8/2019 | Hall |
| 2020/0159871 A1 | | 5/2020 | Bowen |
| 2020/0219295 A1 * | | 7/2020 | el Kaliouby ......... G06K 9/6273 |
| 2020/0293765 A1 * | | 9/2020 | Bryant, III ............ G06F 3/0482 |
| 2020/0301566 A1 * | | 9/2020 | Monk ..................... G06F 17/10 |
| 2021/0096729 A1 | | 4/2021 | Dalonzo et al. |
| 2021/0191741 A1 | | 6/2021 | Li et al. |
| 2021/0382590 A1 * | | 12/2021 | Fong ..................... G06Q 50/01 |
| 2021/0383588 A1 | | 12/2021 | Lee et al. |
| 2021/0397270 A1 * | | 12/2021 | Misra .................. G06F 3/04895 |
| 2022/0070125 A1 * | | 3/2022 | Vasamsetti ............ H04L 51/063 |
| 2022/0221985 A1 * | | 7/2022 | Moore .................. G06F 3/0236 |

OTHER PUBLICATIONS

International Search Report received for PCT Patent Application No. PCT/US2020/050755, dated Dec. 11, 2020, 4 pages.

Non-Final Office Action received for U.S. Appl. No. 17/020,514, dated Jul. 8, 2021, 45 pages.

Horowitz, Paul, "How to Access & Use Different Emoji Skin Tones on Mac", Available online at: <https://osxdaily.com/2015/04/14/use-diverse-emoji-skin-tone-mac-os-x/>, Apr. 14, 2015, pp. 1-7.

Horowitz, Paul, "Lose the Cartoon Yellow People Emoji! How to Access Diverse Emoji Icons in iOS", Available online at: <https://osxdaily.com/2015/04/11/how-access-diverse-emoji-icons-ios/>, Apr. 11, 2015, pp. 1-10.

Final Office Action received for U.S. Appl. No. 17/020,514, dated Jan. 27, 2022, 49 pages.

Schofield, Tim. "Gboard for Android: Update to Google Keyboard!", YouTube, Available online at: <https://www.youtube.com/watch?v=KAW0iTFnv5A>, [Retrieved Oct. 27, 2022], Dec. 15, 2016, 4 pages.

* cited by examiner

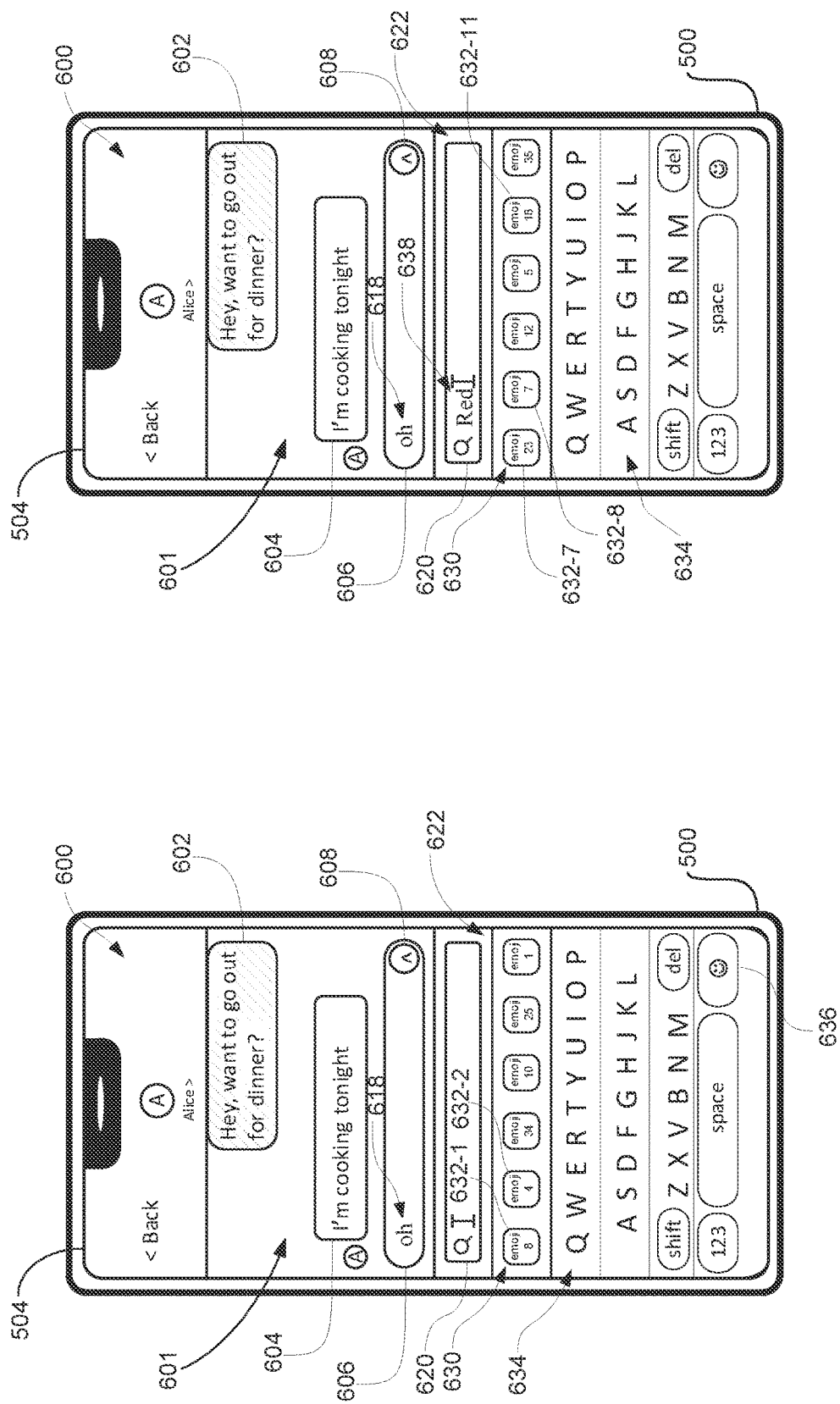

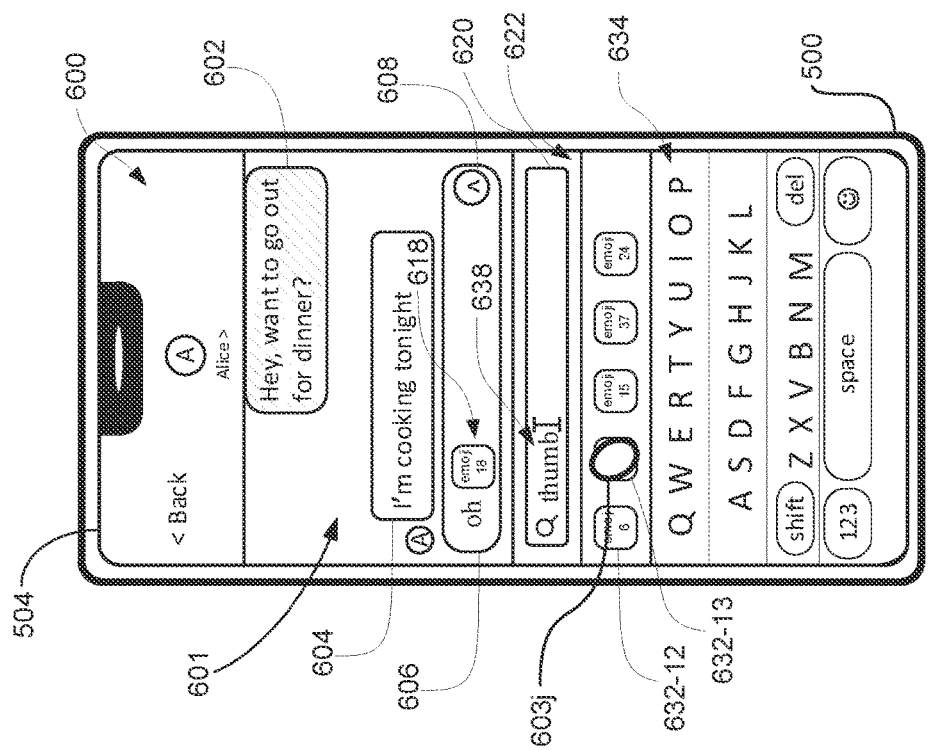

EMOJI USER INTERFACES

CROSS-REFERENCE TO RELATED APPLICATIONS

This application claims the benefit of U.S. Provisional Application No. 63/041,972, filed Jun. 21, 2020, the contents of which is incorporated herein by reference in its entirety for all purposes.

FIELD OF THE DISCLOSURE

This specification relates generally to electronic devices that display user interfaces for searching for and/or entering emojis.

BACKGROUND

User interaction with electronic devices has increased significantly in recent years. These devices can be devices such as computers, tablet computers, televisions, multimedia devices, mobile devices, and the like.

In some circumstances, users wish to search for or enter emojis (e.g., small digital images or icons used to express an idea, emotion, etc.) into user interfaces displayed by the electronic device (e.g., word-processing user interfaces, messaging user interfaces). An electronic device can provide a user with user interfaces for performing such actions associated with emojis.

SUMMARY

Some embodiments described in this disclosure are directed to user interfaces for searching for and/or entering emojis into a user interface. Enhancing these interactions improves a user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
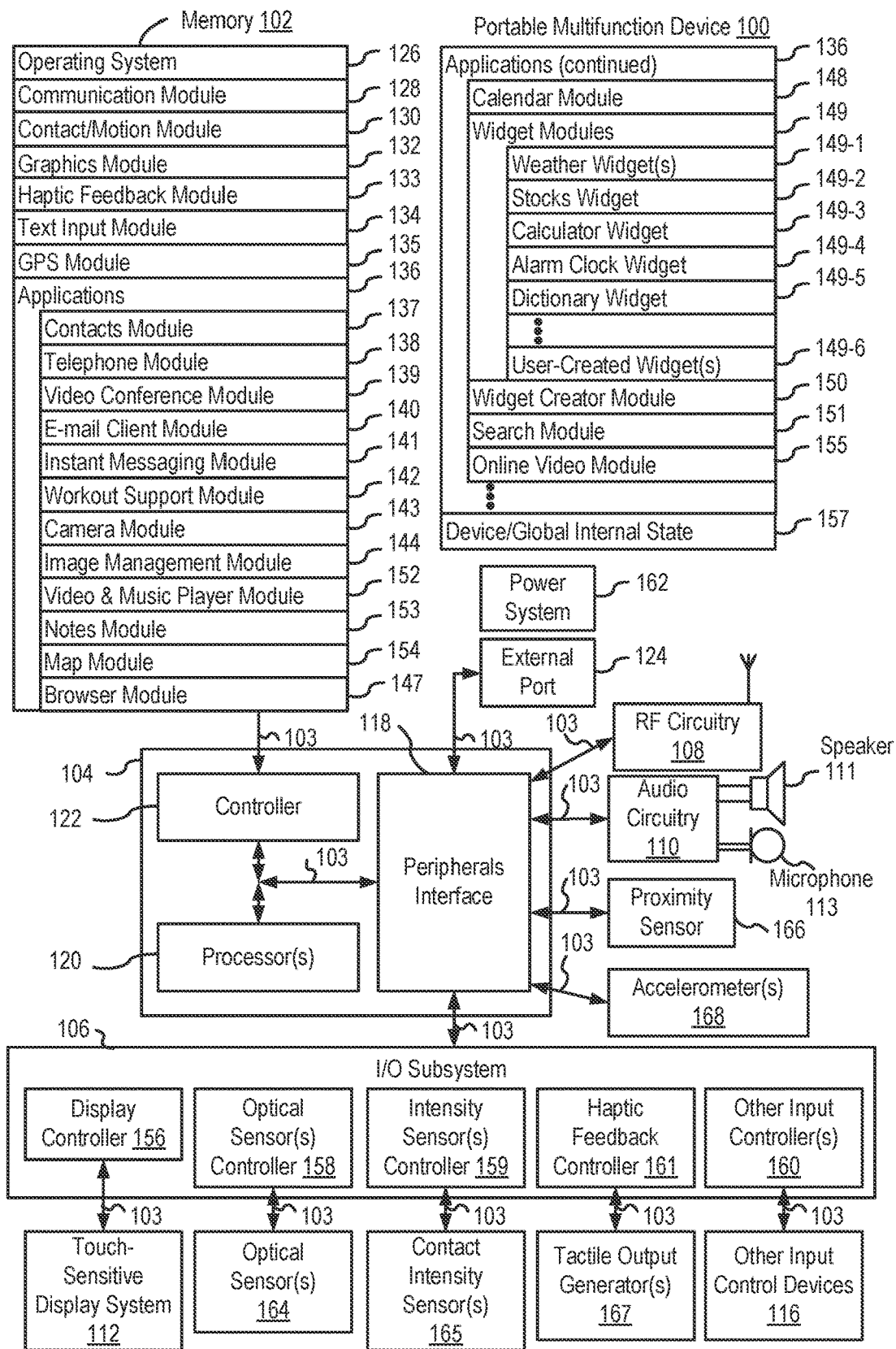
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient user interfaces and mechanisms for searching for and/or entering emojis into, for example, a content entry region of a user interface. In some implementations, an electronic device maintains the display space occupied by an emoji searching user interface throughout a user's interaction with the emoji searching user interface (e.g., while performing various actions such as selecting emojis, searching for emojis using text searching, browsing through emojis by category, etc.), thereby reducing the need to negatively impact what can be displayed in a content entry region of the user interface (e.g., including the content of a word processing application, the content of a messaging application, etc.) displayed with the emoji searching user interface. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
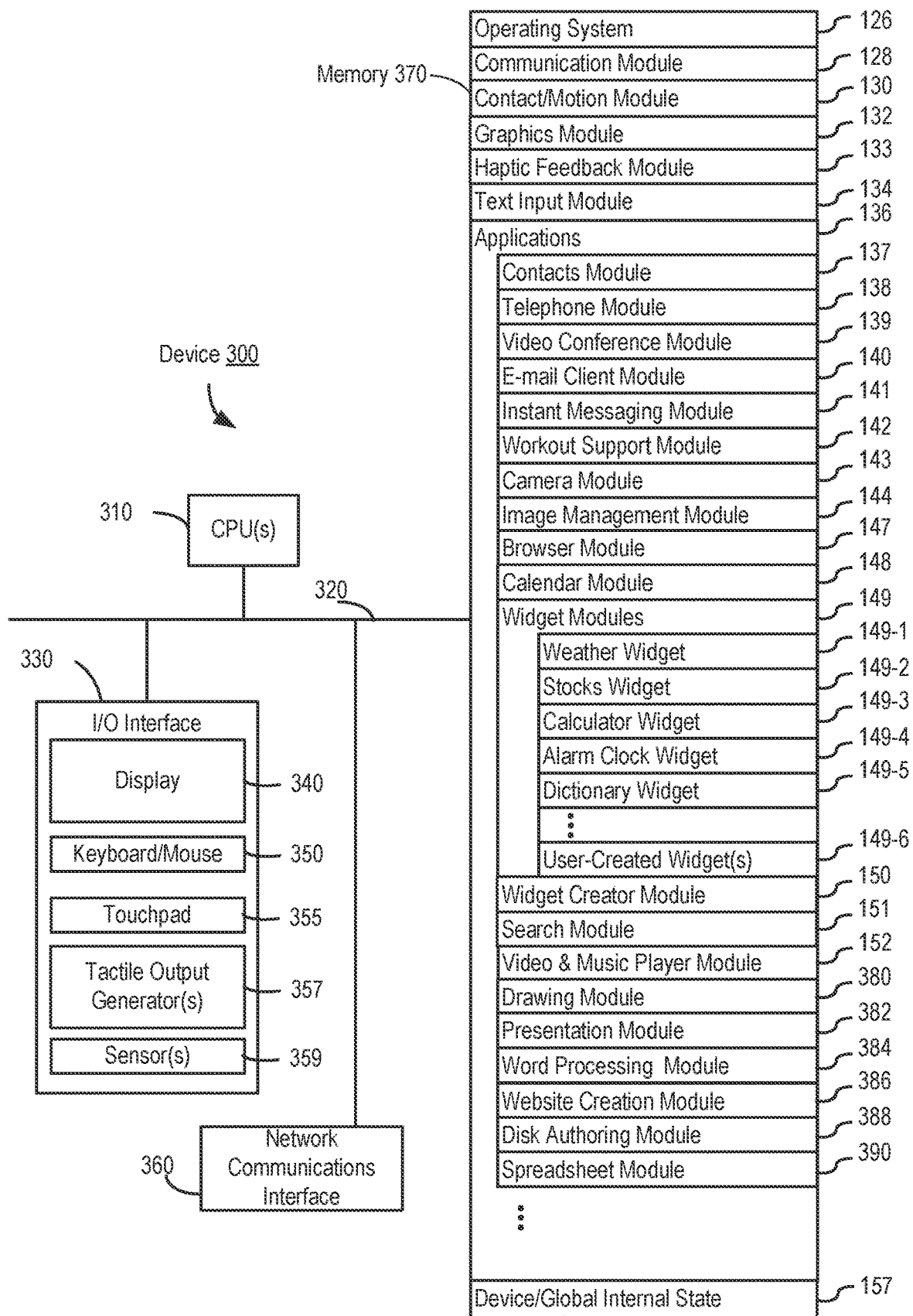
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are, optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
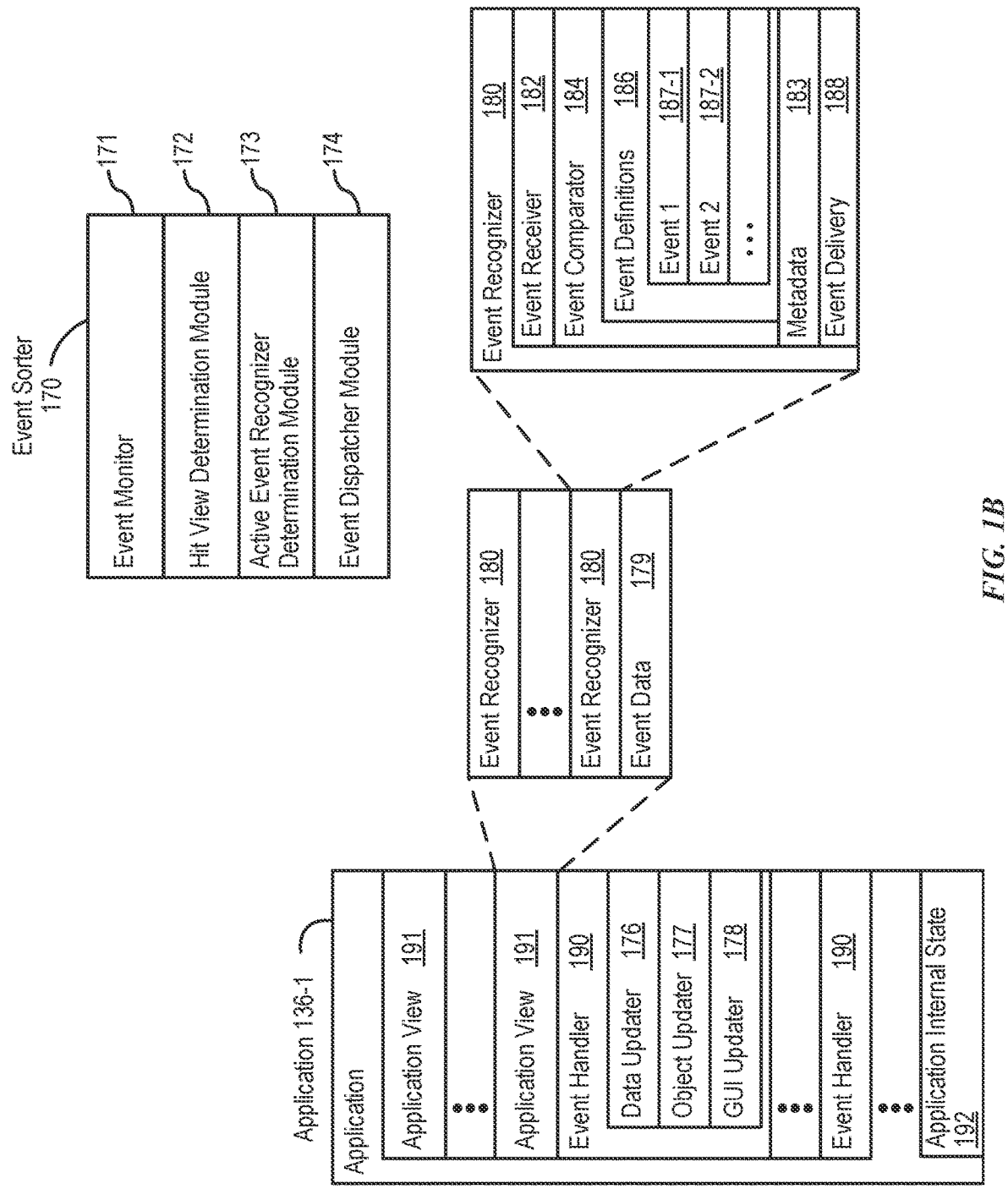
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
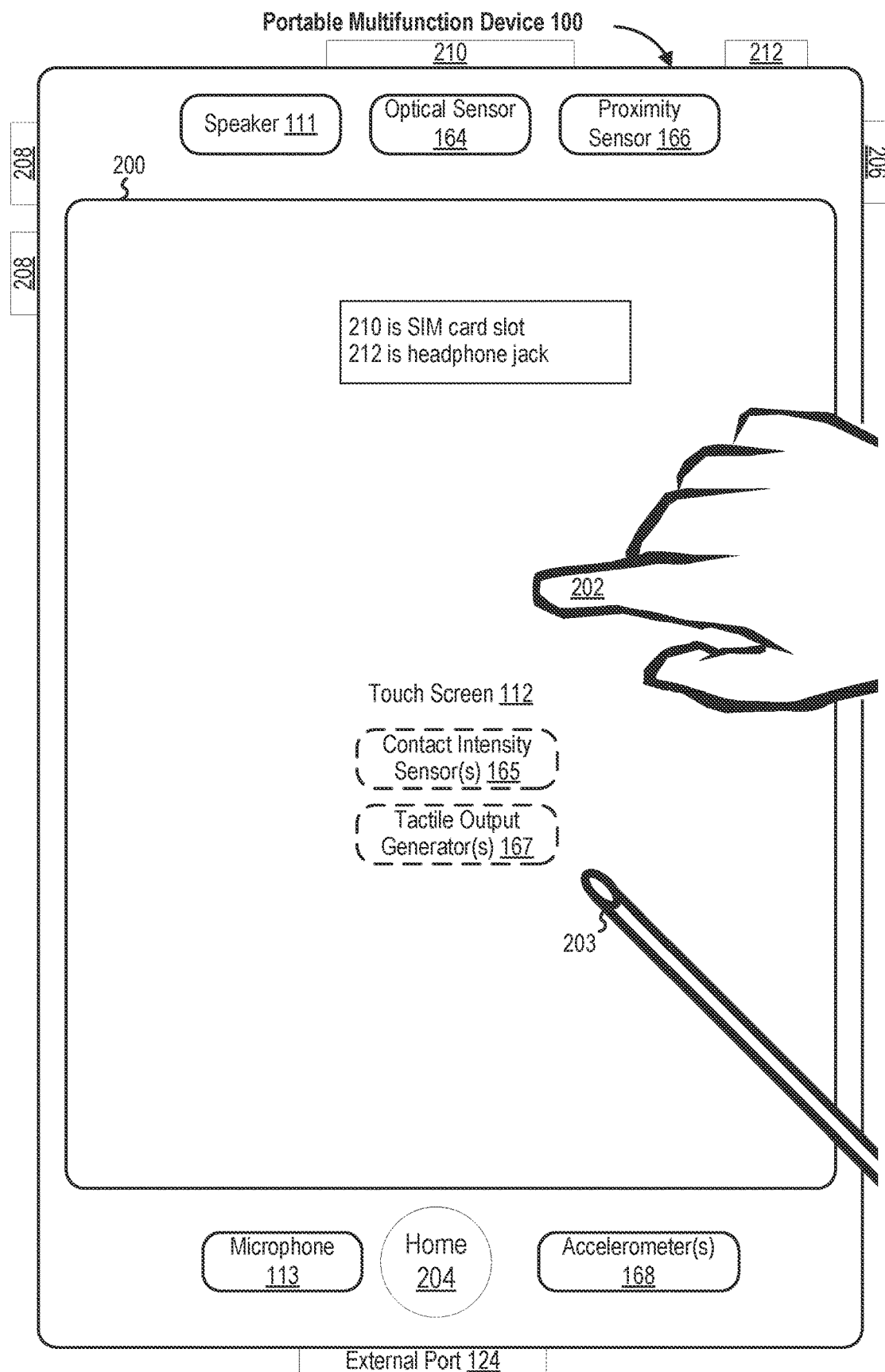
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
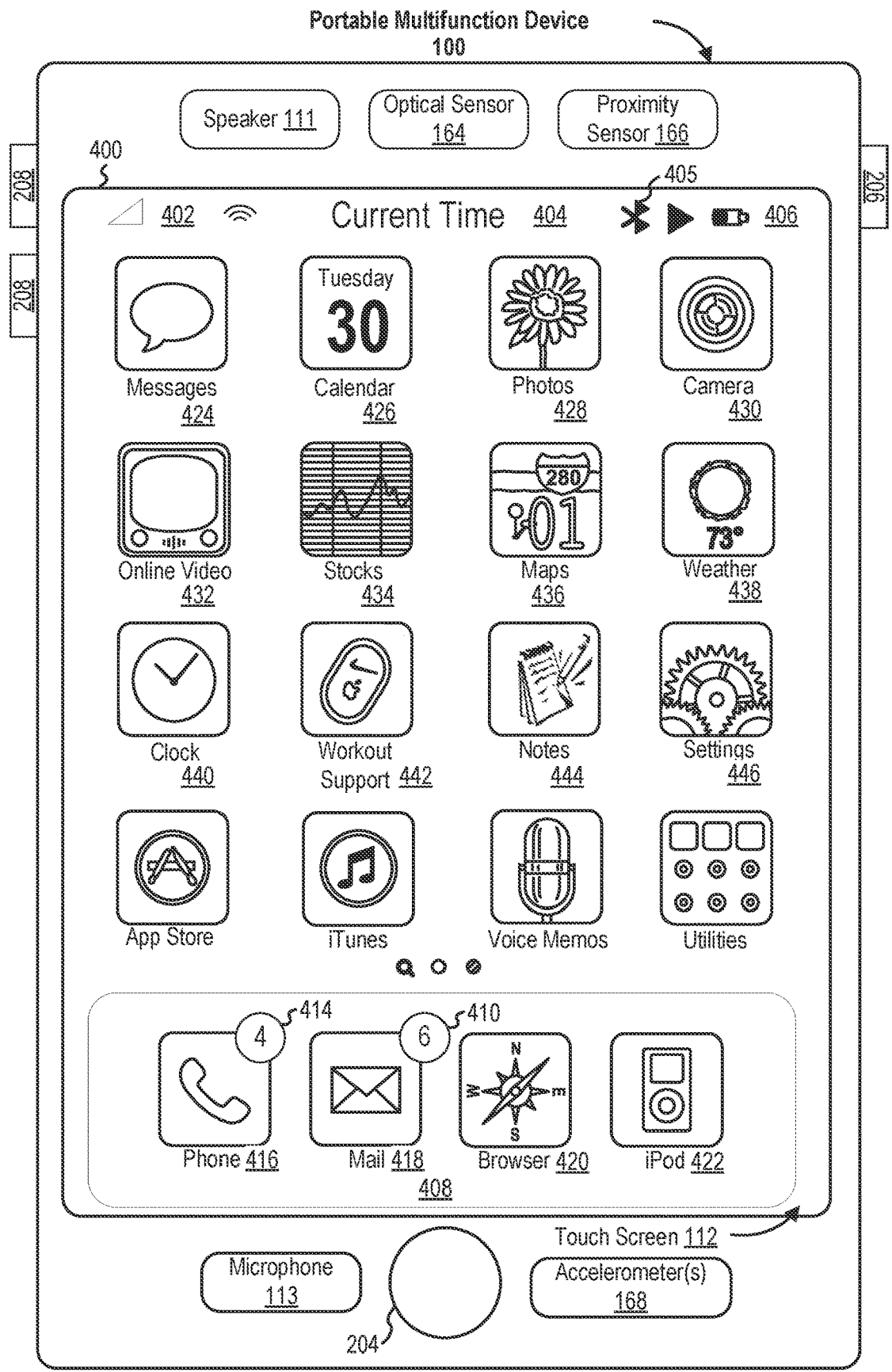
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
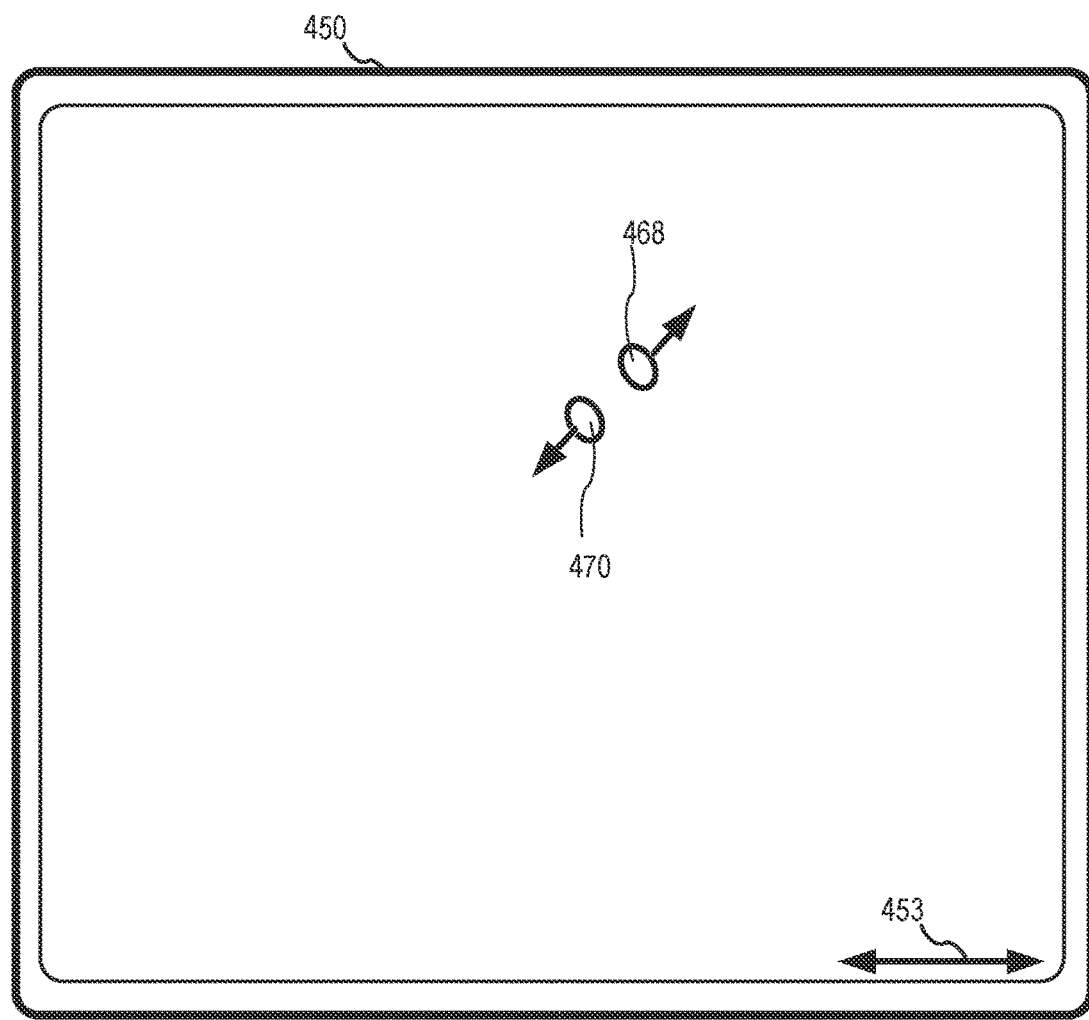
FIG. 4B illustrates an exemplary user interface for a multifunction device with a touch-sensitive surface that is separate from the display in accordance with some embodiments.
Figure 4B:
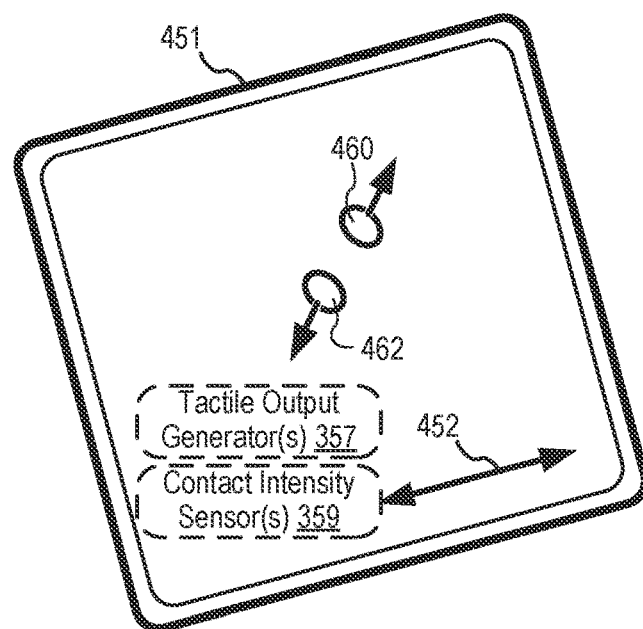

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
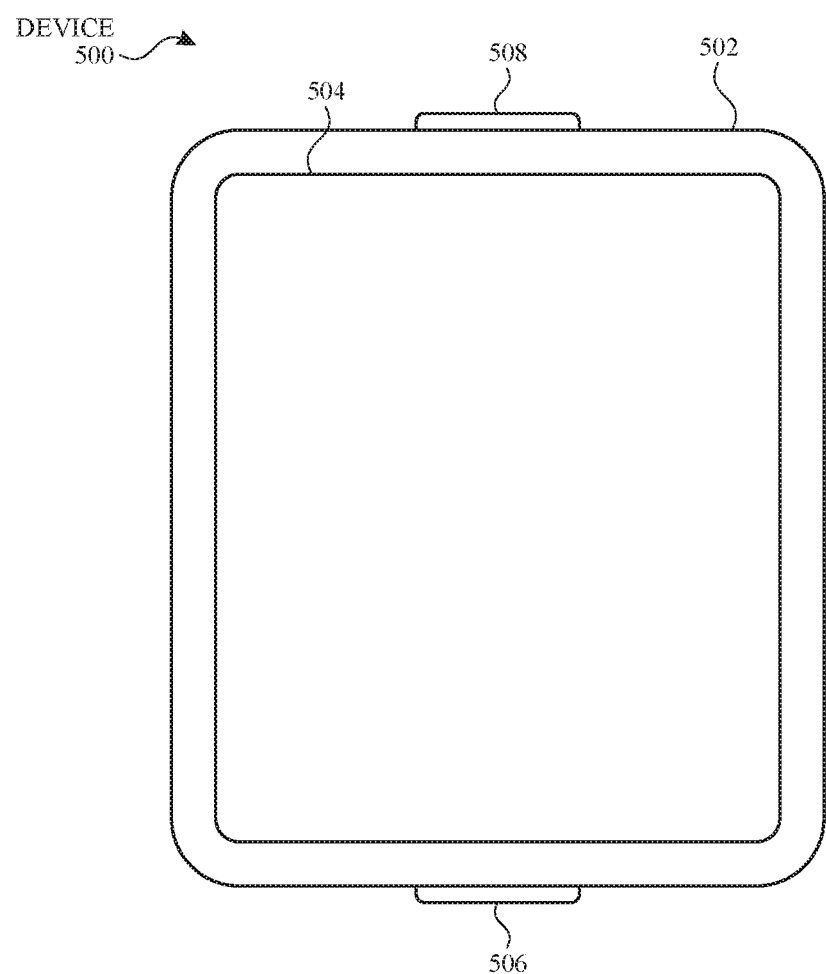
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
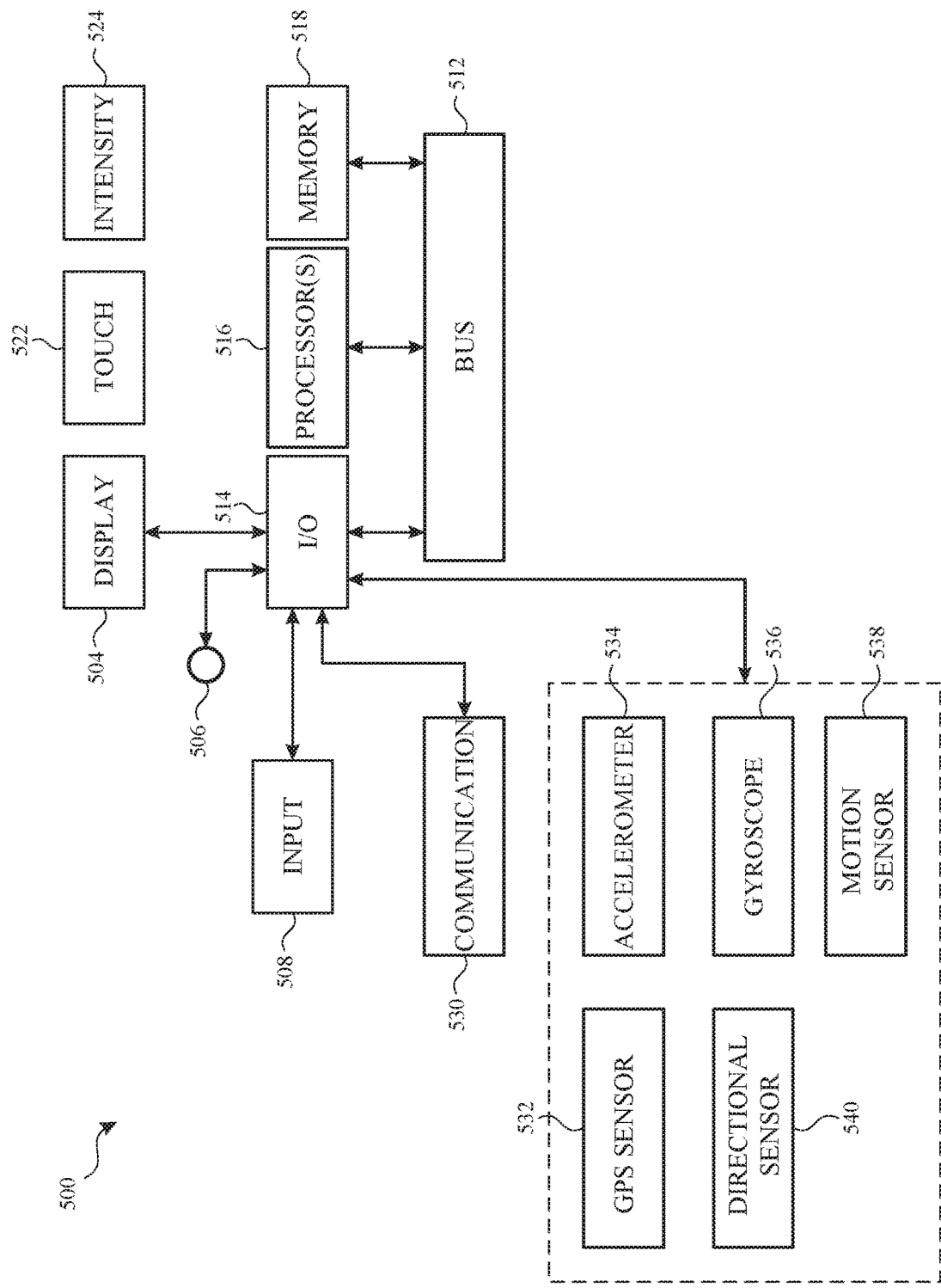
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 7:
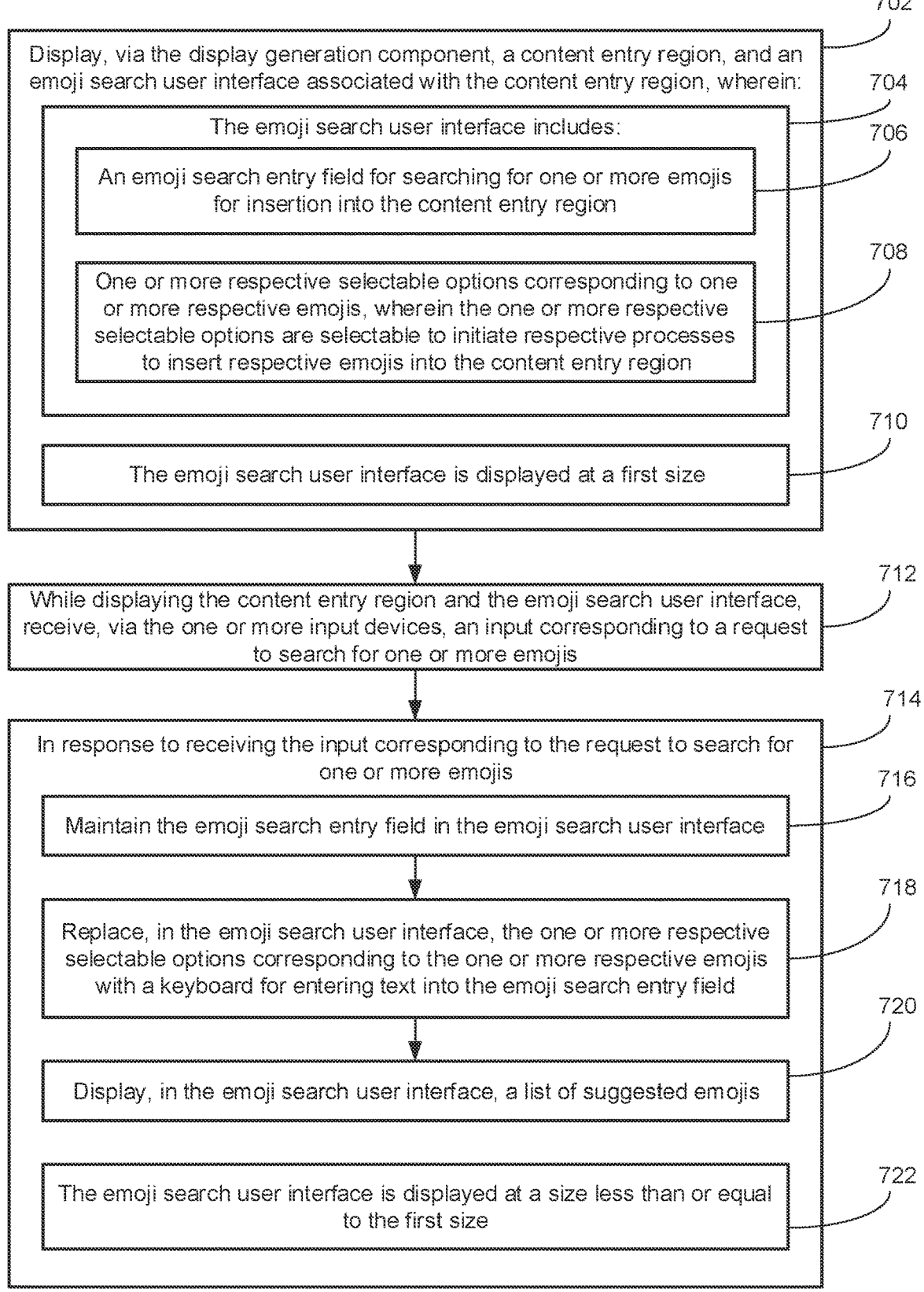
FIG. 7 is a flow diagram illustrating a method for providing efficient user interfaces for searching for and/or entering emojis into a user interface in accordance with some embodiments.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
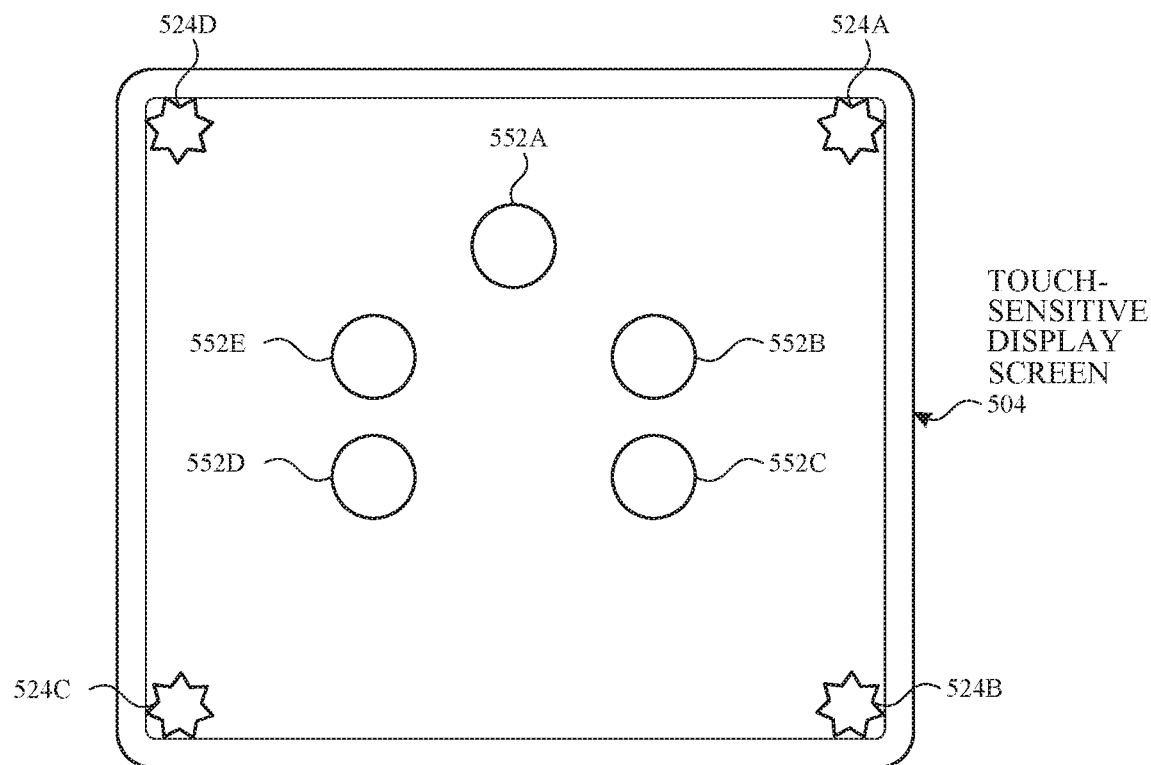
FIGS. 5C-5D illustrate exemplary components of a personal electronic device having a touch-sensitive display and intensity sensors in accordance with some embodiments.
Figure 5C:
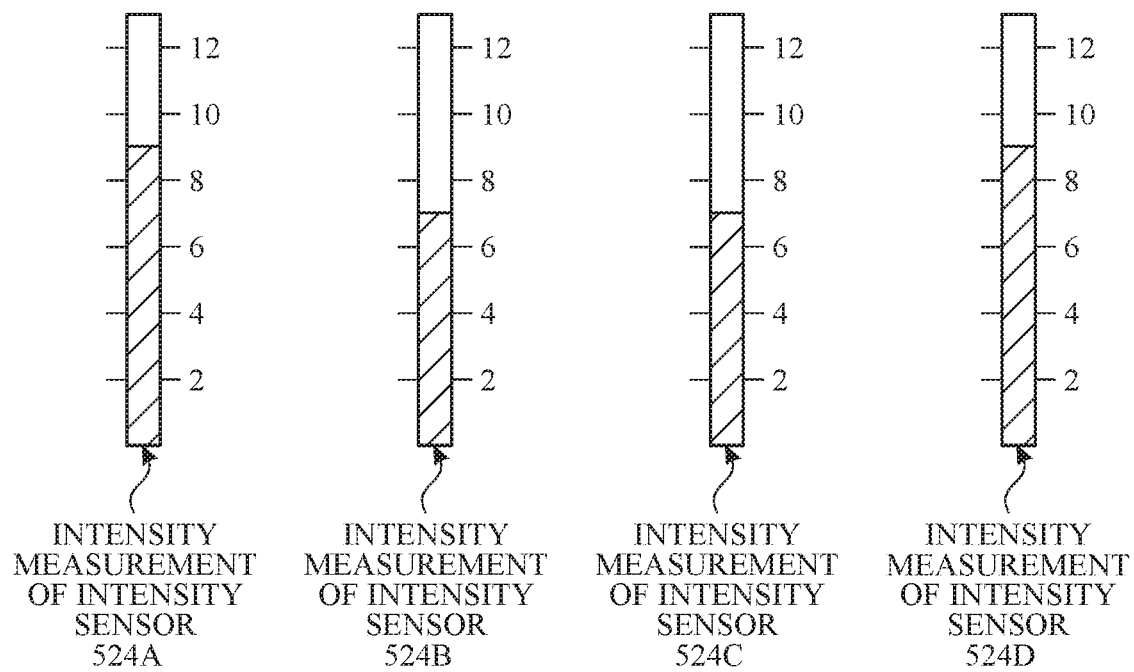
Figure 5D:
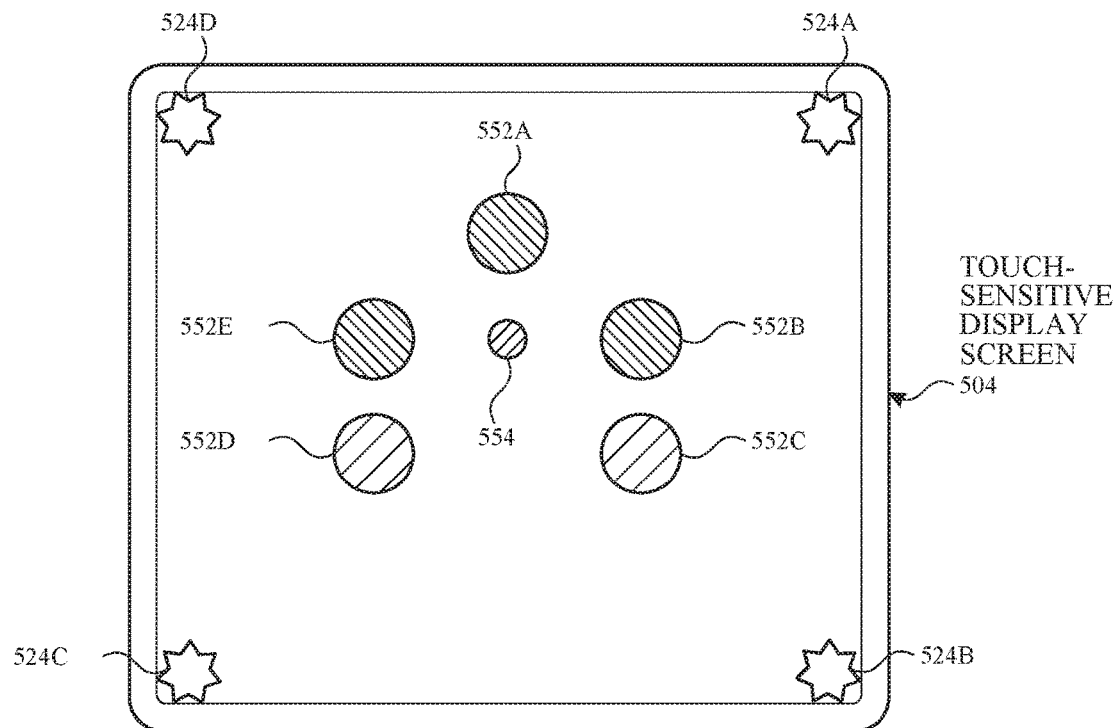
Figure 5D:
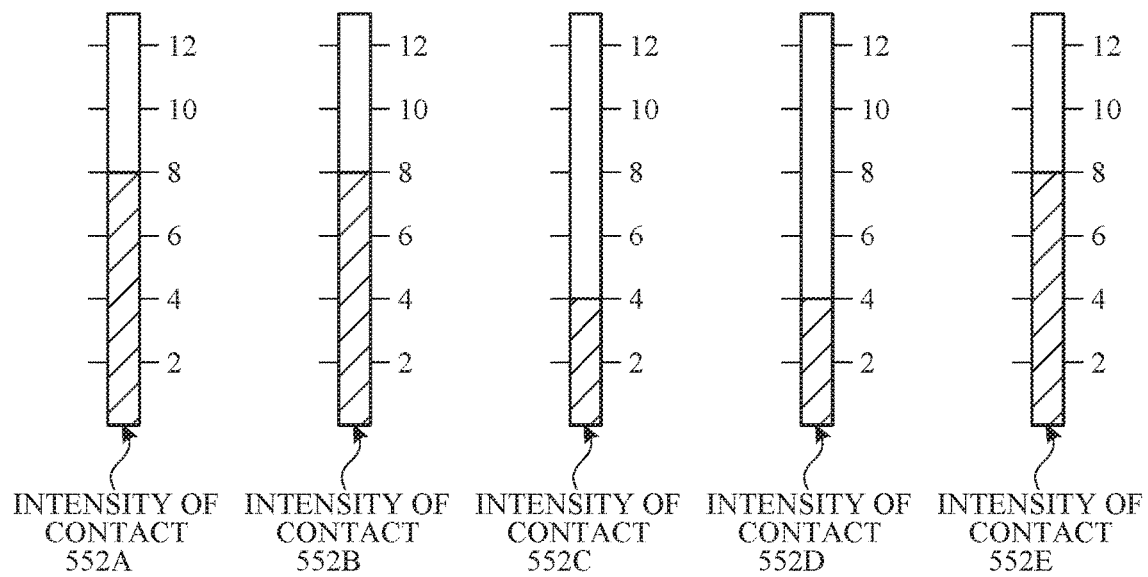

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and Di is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
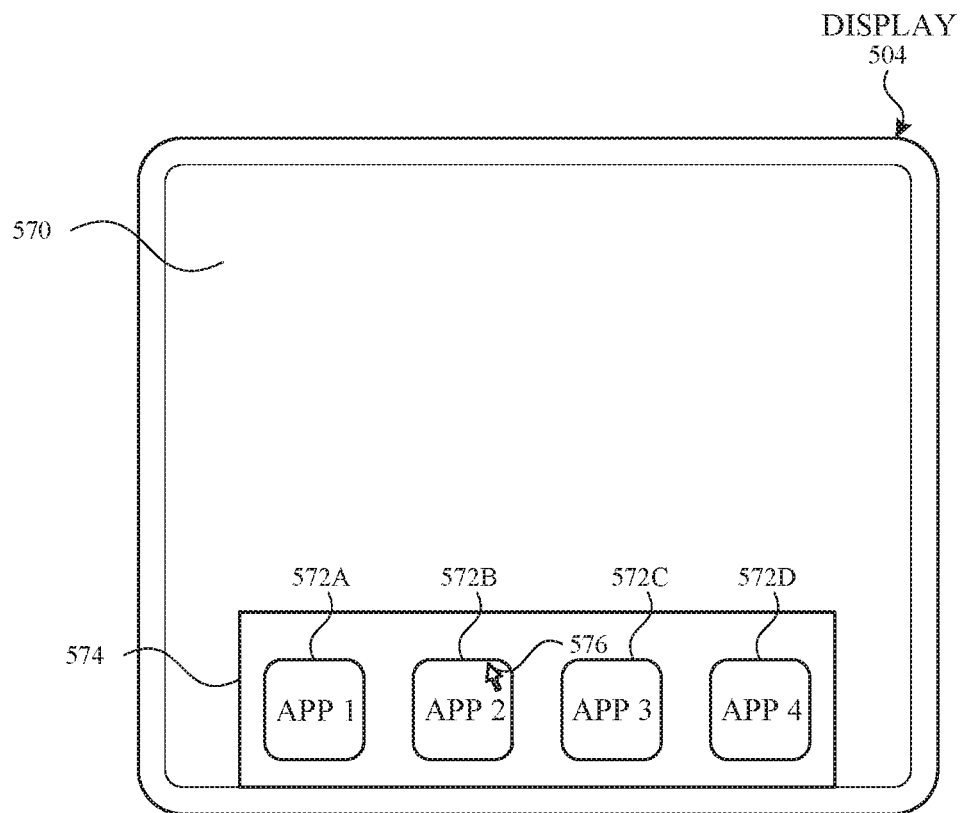
FIGS. 5E-5H illustrate exemplary components and user interfaces of a personal electronic device in accordance with some embodiments.
Figure 5E:
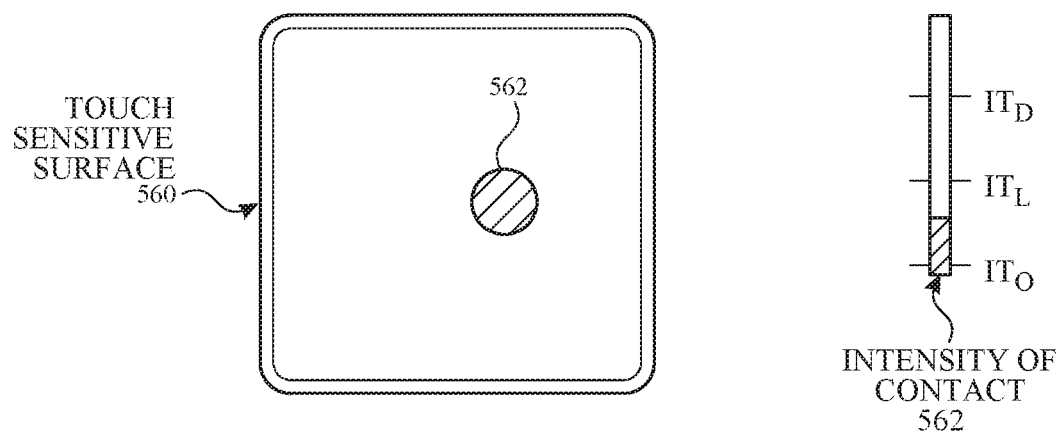
Figure 5F:
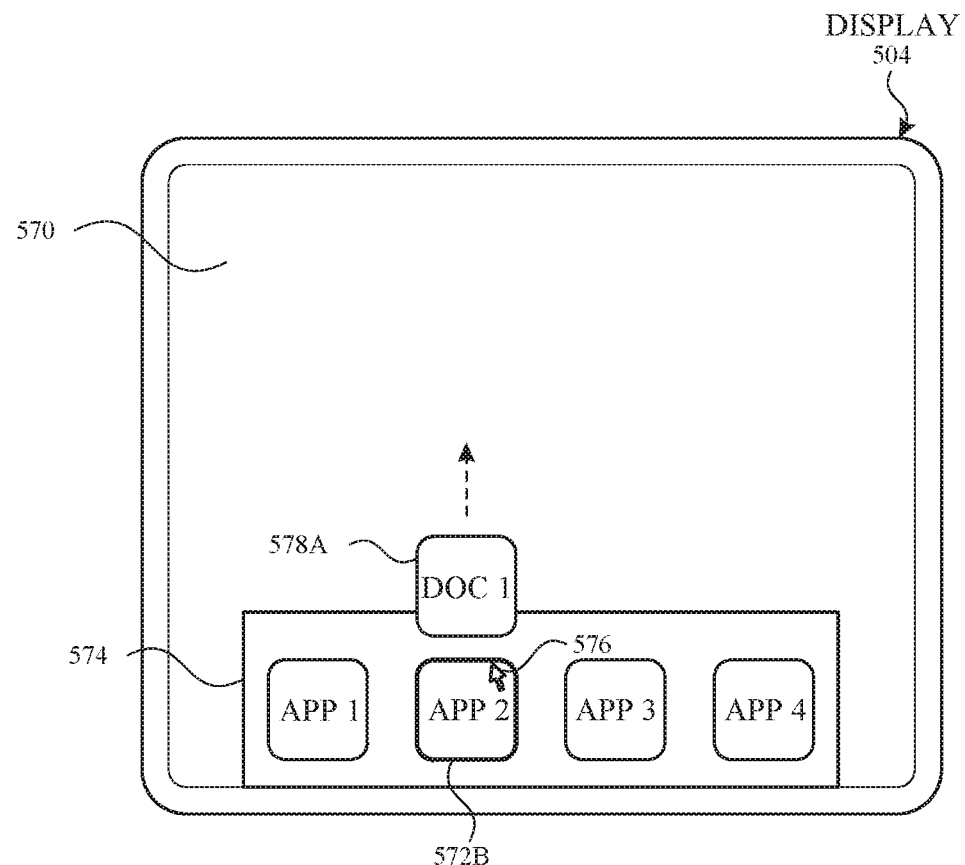
Figure 5F:
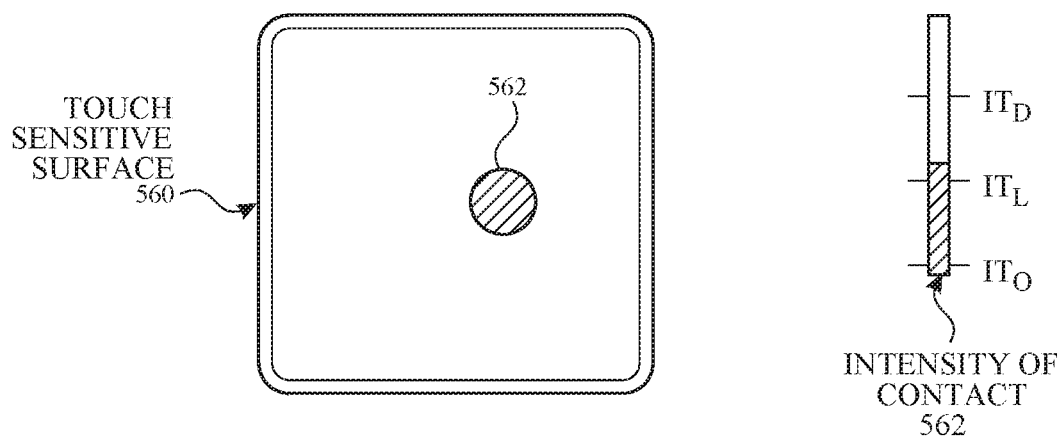
Figure 5G:
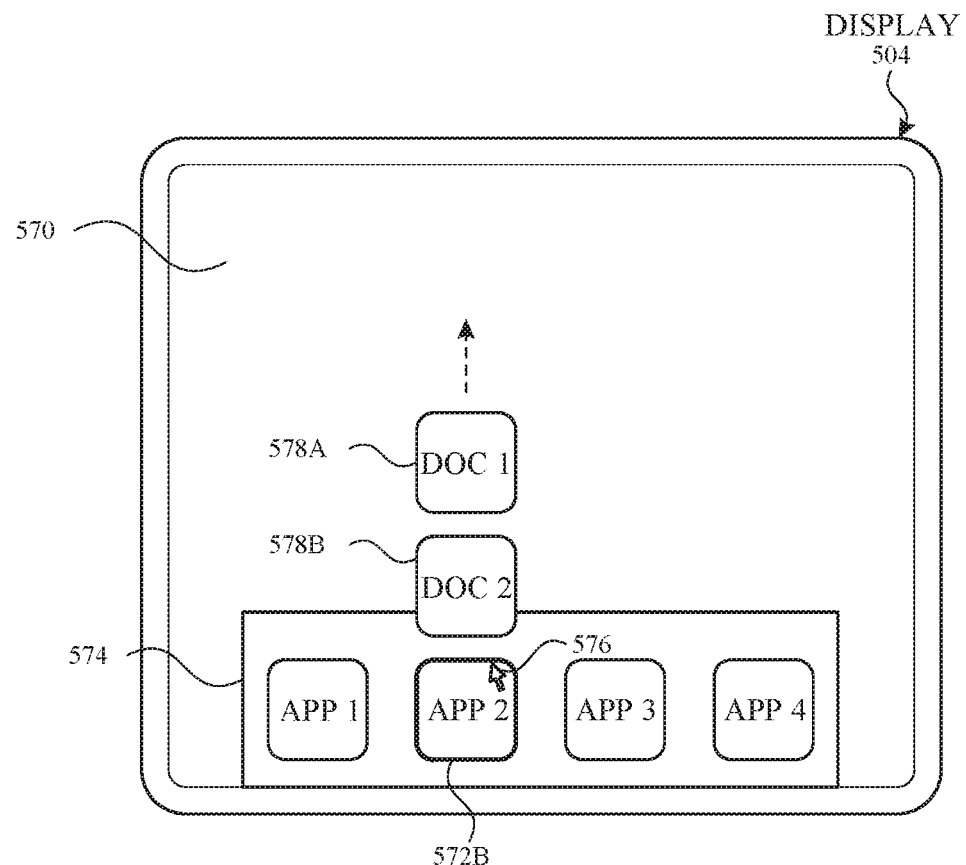
Figure 5G:
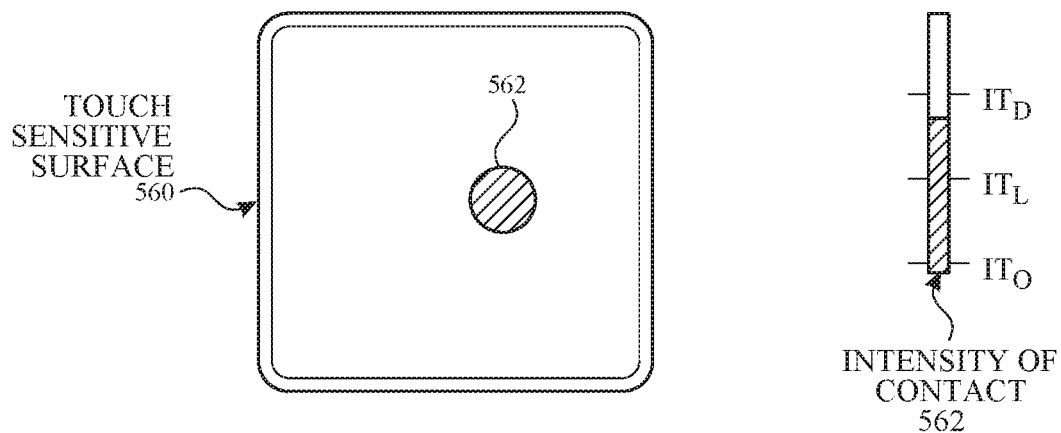
Figure 5H:
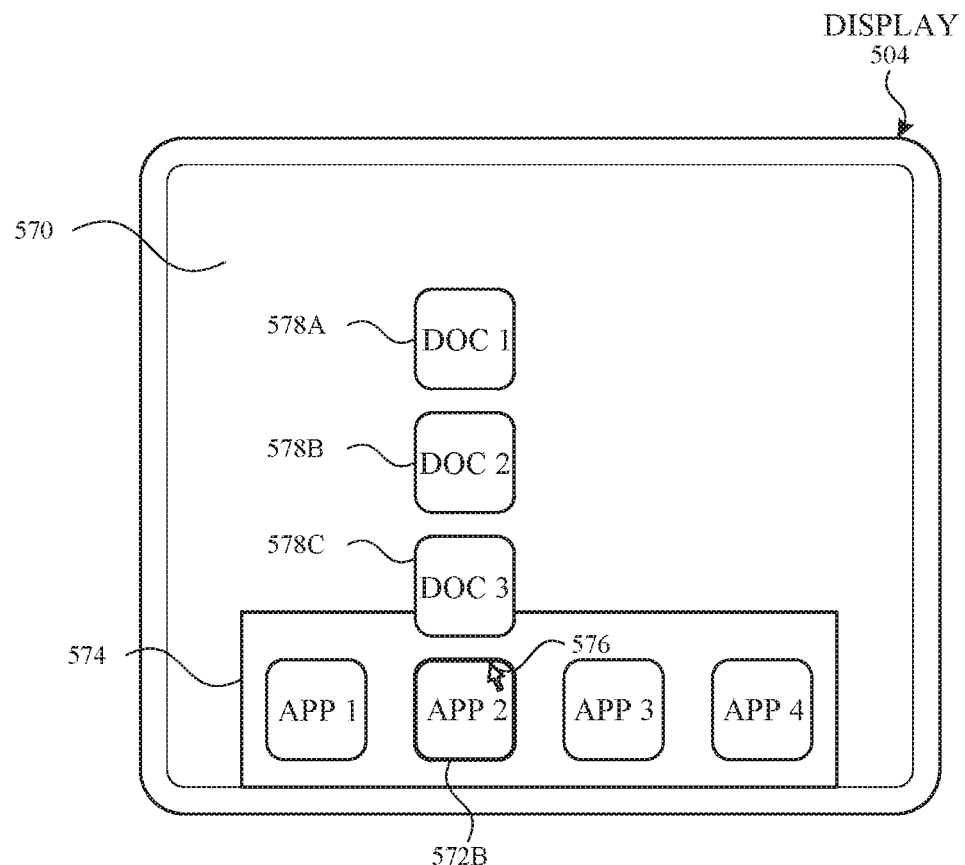
Figure 5H:
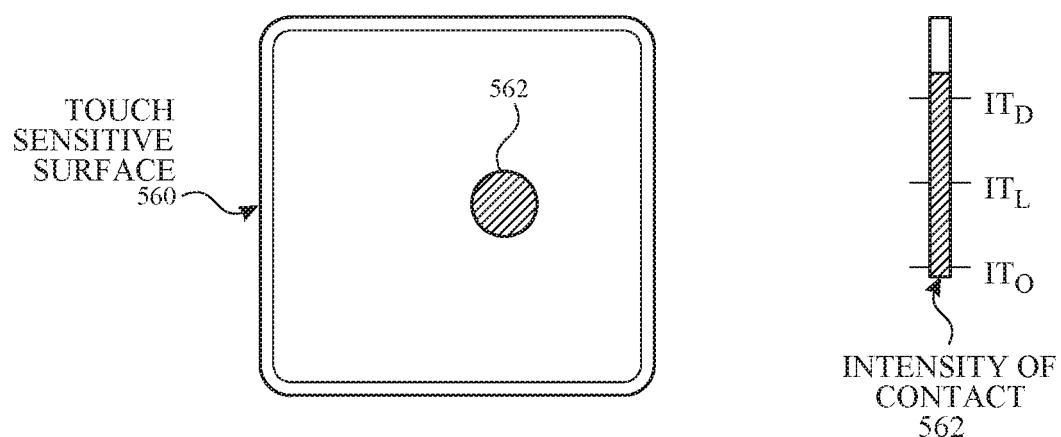

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as device 100, device 300, or device 500.

User Interfaces and Associated Processes

User Interfaces for Searching for Emojis

Users interact with electronic devices in many different manners, including entering content (e.g., text, images, emojis) into various user interfaces displayed by electronic devices (e.g., entering text into a word processing application user interface, entering text into a messaging application user interface as part of sending messages to a messaging conversation facilitated by the messaging application). In some situations, users enter emojis (e.g., small digital images or icons used to express an idea, emotion, etc.) into user interfaces displayed by the electronic device (e.g., word processing and/or messaging user interfaces) using, for example, an emoji keyboard (e.g., a "keyboard" displayed by an electronic device whose "keys" are selectable to insert corresponding emojis into the user interface). In some situations, searching for the desired emoji(s) can be time-consuming, especially when the collection of available emojis is large. Further, in some situations, searching for desired emoji(s) can interfere with the underlying content displayed by the underlying user interface (e.g., word processing and/or messaging user interfaces, for example). The embodiments described below provide ways in which an electronic device provides efficient user interfaces for searching for and/or entering emojis into a user interface, thus enhancing the user's interaction with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6B:
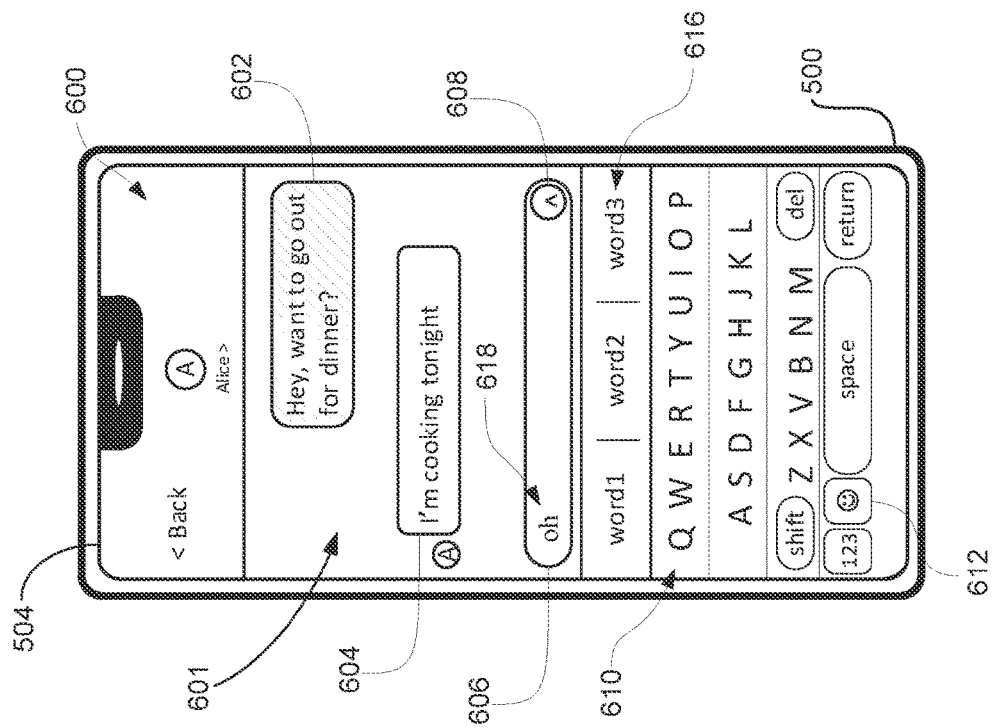
FIGS. 6A-6Q illustrate exemplary ways in which an electronic device provides efficient user interfaces for searching for and/or entering emojis into a user interface in accordance with some embodiments.
Figure 6A:
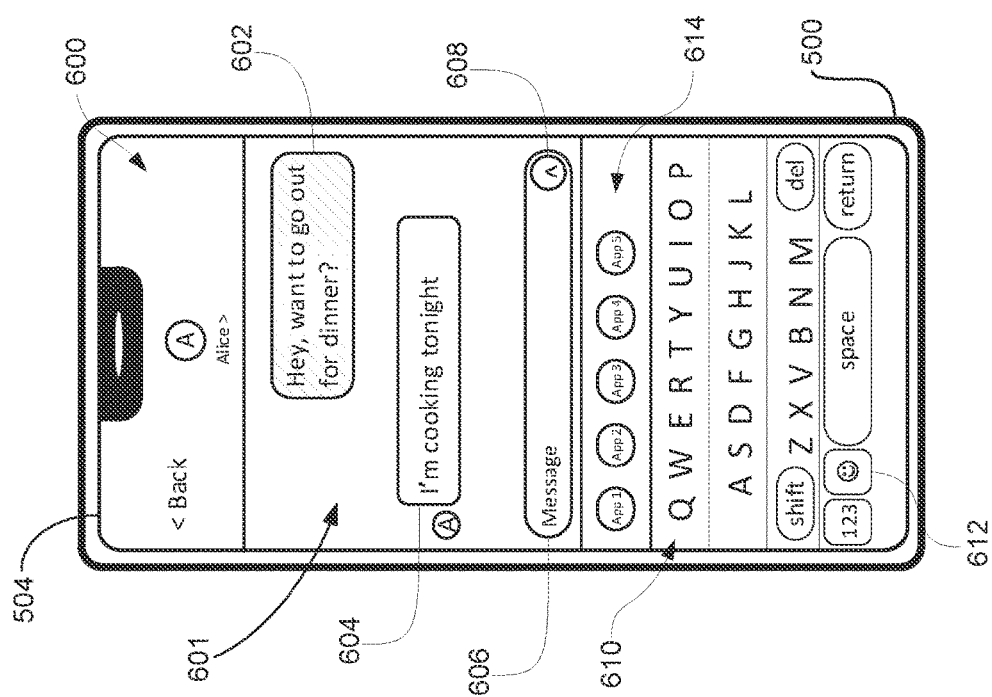
Figure 6D:
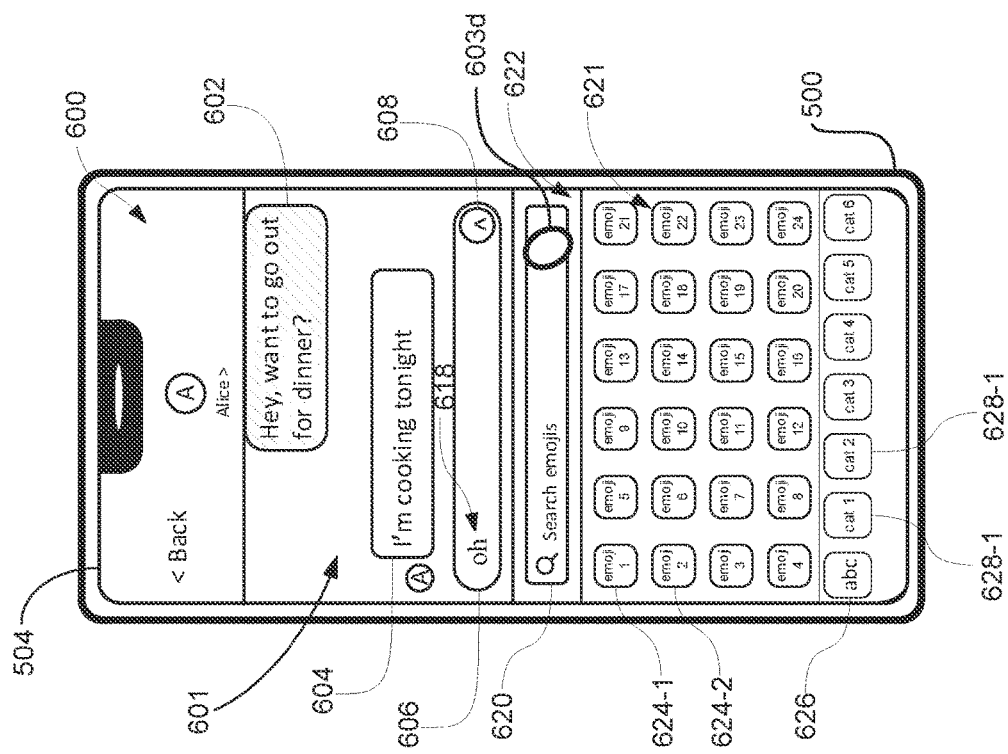
Figure 6C:
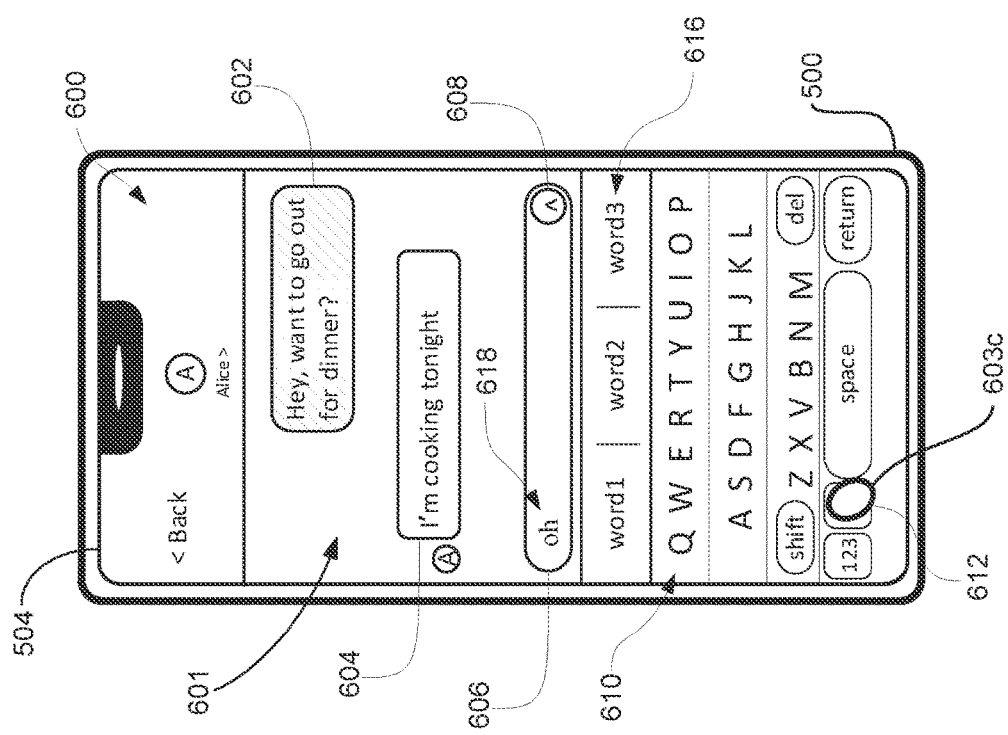
Figure 6H:
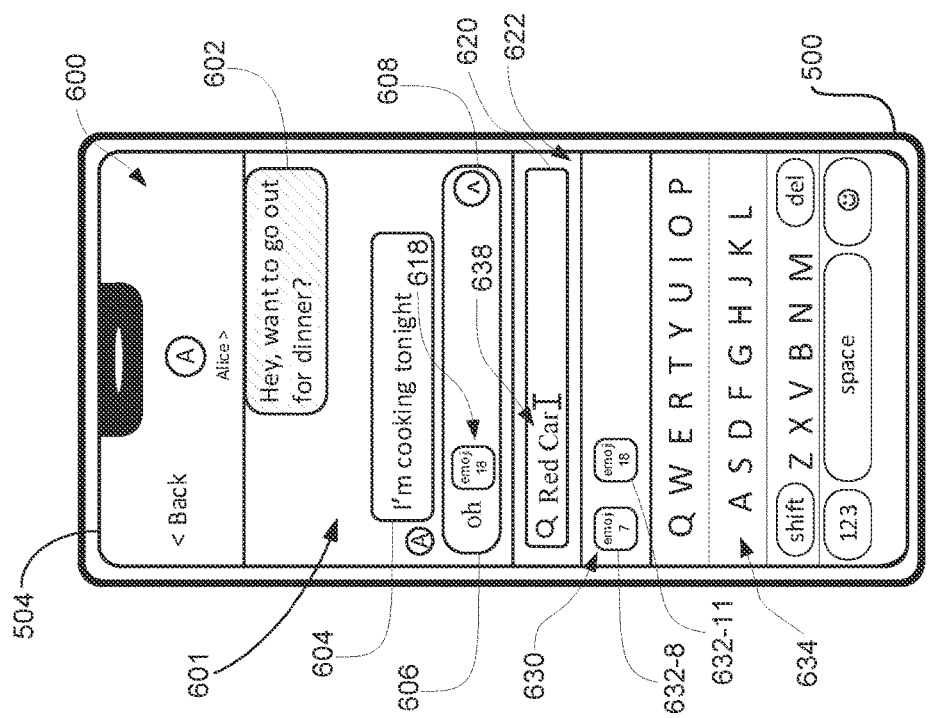
Figure 6G:
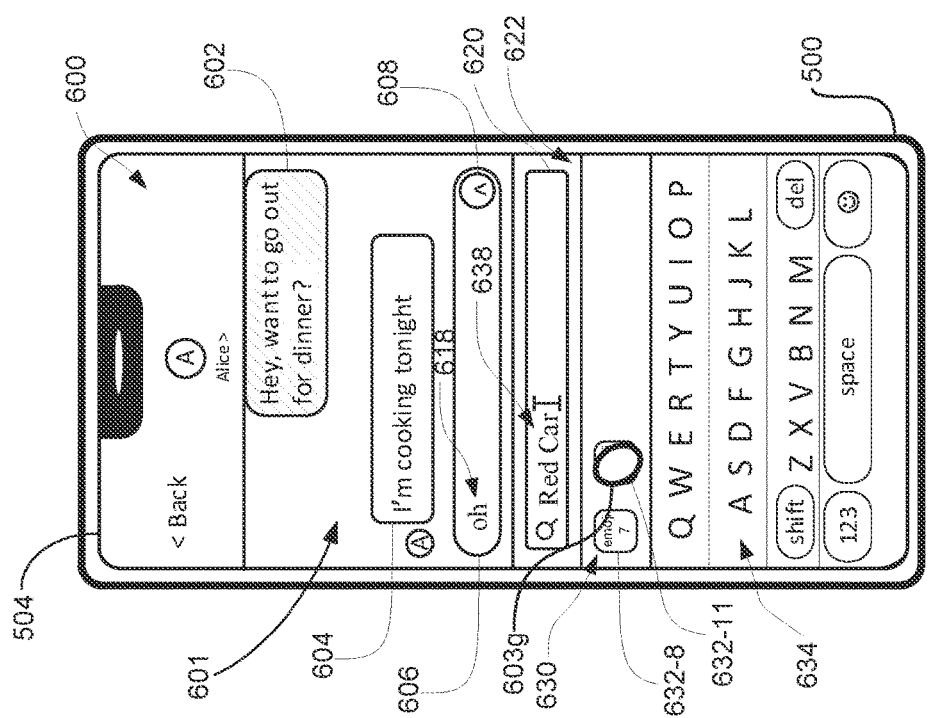
Figure 6L:
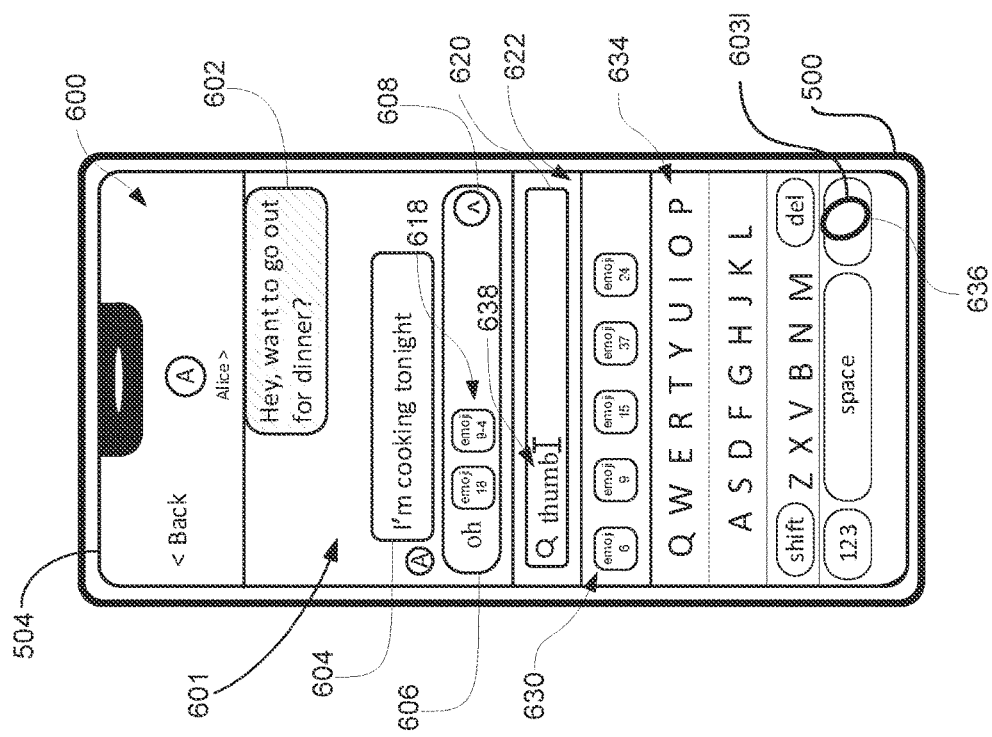
Figure 6K:
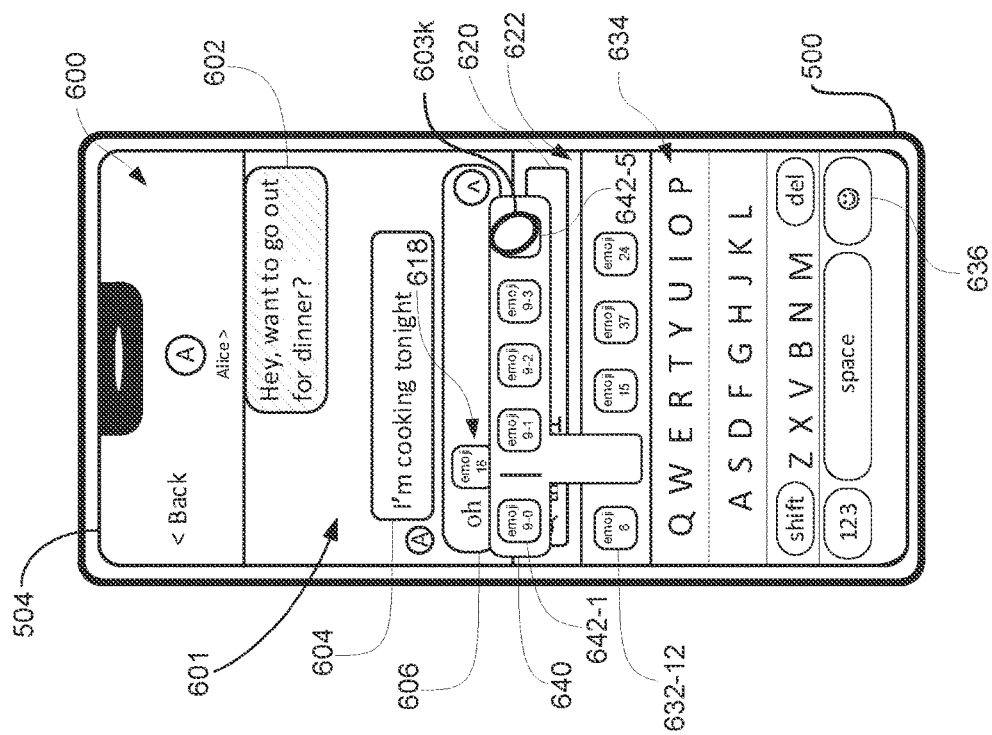
Figure 6N:
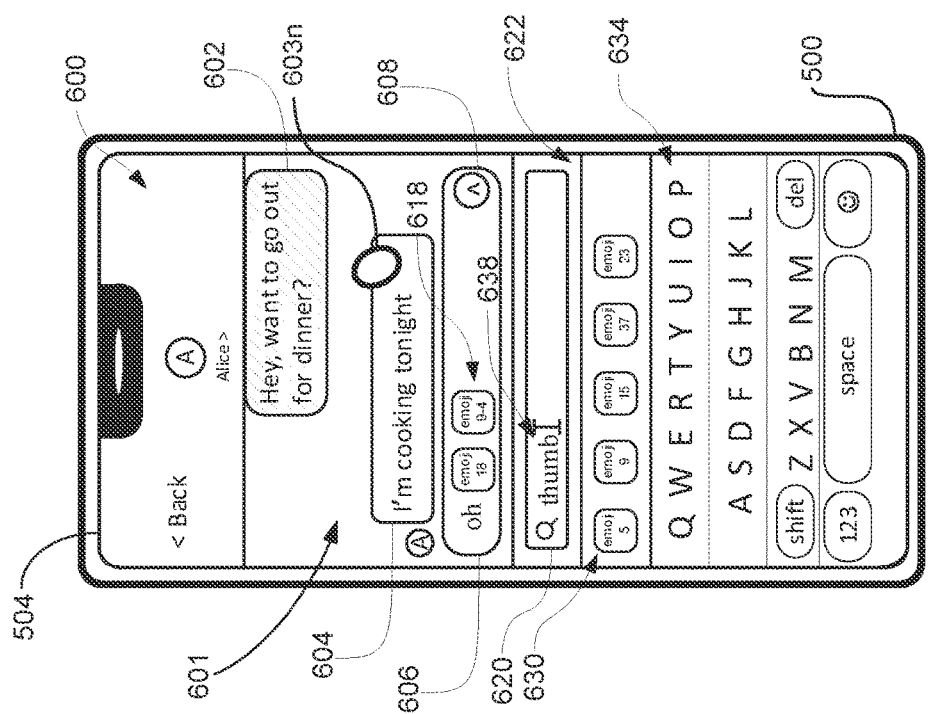
Figure 6M:
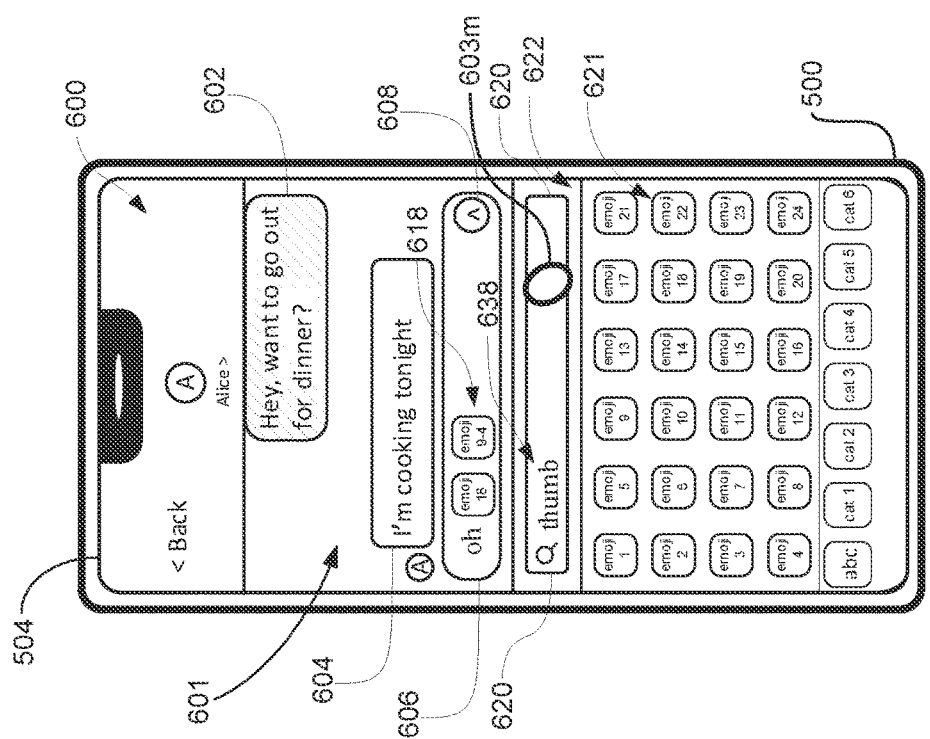
Figure 6P:
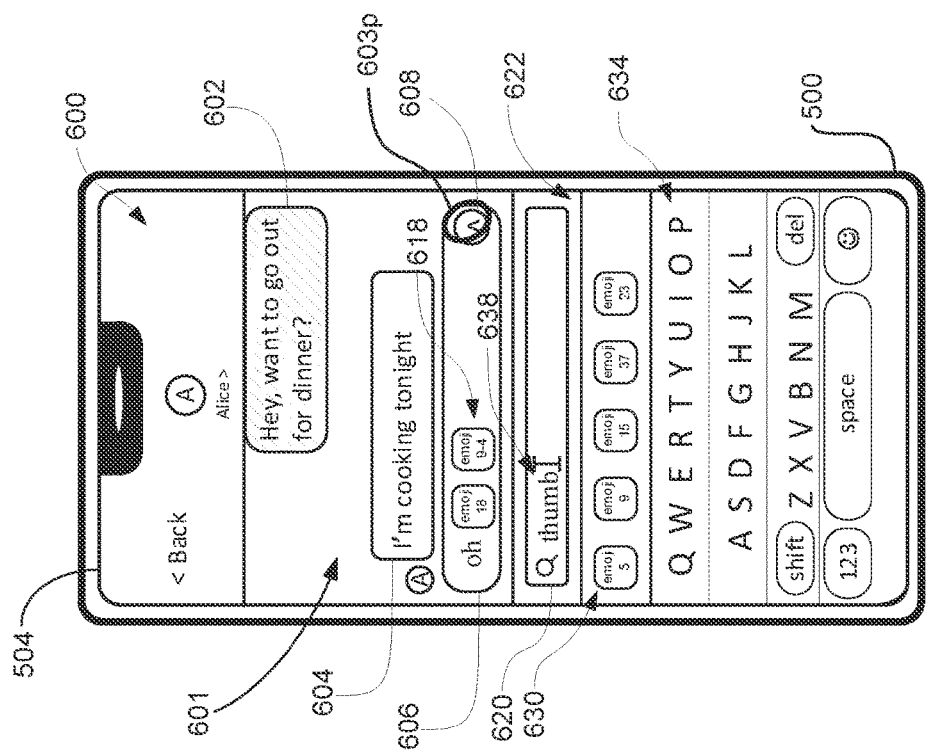
Figure 6O:
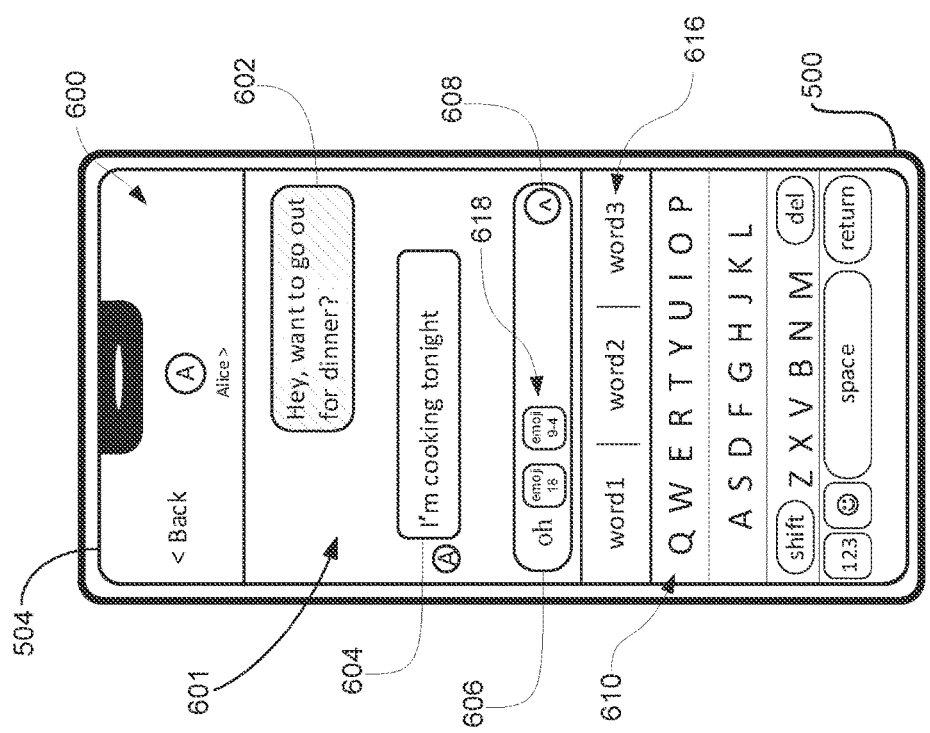
Figure 6Q:
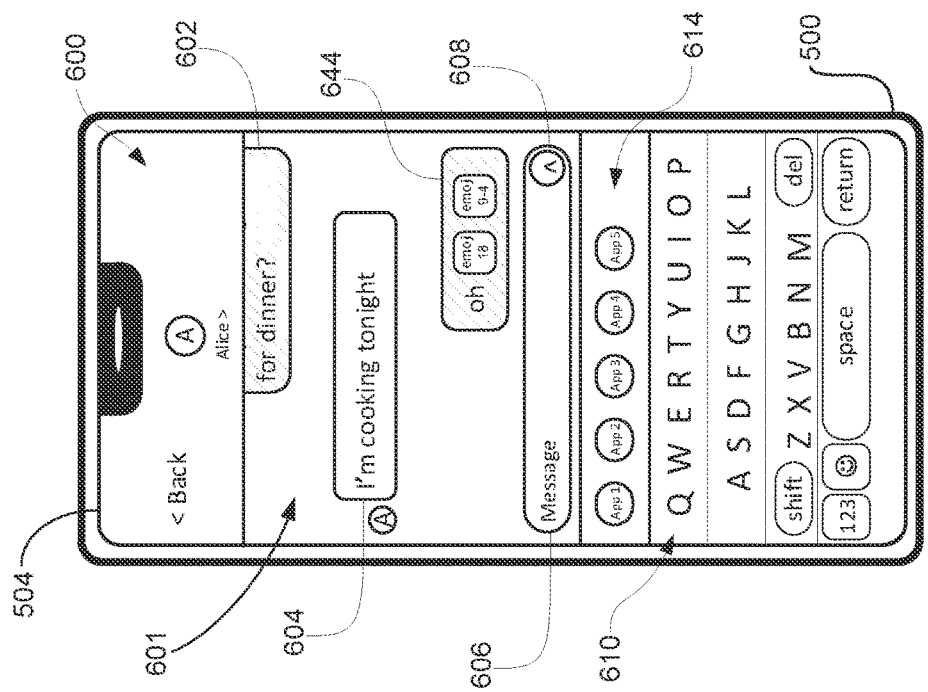

FIGS. 6A-6Q illustrate exemplary ways in which an electronic device provides efficient user interfaces for searching for and/or entering emojis into a user interface. The embodiments in these figures are used to illustrate the processes described below, including the processes described with reference to FIG. 7. Although FIGS. 6A-6Q illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6Q.

FIG. 6A illustrates an exemplary device 500 displaying a user interface. In some embodiments, the user interface is displayed via a display generation component. In some embodiments, the display generation component is a hardware component (e.g., including electrical components) capable of receiving display data and displaying a user interface. In some embodiments, examples of a display generation component include a touch screen display 504, a monitor, a television, a projector, an integrated, discrete, or external display device, or any other suitable display device.

As shown in FIG. 6A, device 500 is displaying a messaging user interface 600, though it is understood, as mentioned herein, that the embodiments described herein are equally applicable to user interfaces other than messaging user interfaces. User interface 600 includes the content of a messaging conversation with a contact (e.g., Alice). User interface 600 optionally includes a content entry and/or display region 601 that includes representations of messages 602 and 604 in the messaging conversation, and a text entry field 606 into which content (e.g., text, emojis, etc.) can be entered. Text entry field 606 is optionally displayed with selectable option 608 that is selectable to transmit the content in text entry field 606 to the messaging conversation, and thus cause that content to be displayed as a representation of a message within region 601.

User interface 600 optionally also includes a keyboard 610 that includes various keys that are selectable to enter content into text entry field 606. Further, in some embodiments, user interface 600 includes user interface element 614 that includes one or more selectable options (e.g., one corresponding to "App 1", one corresponding to "App 2", etc.) that are selectable to perform various operations associated with user interface 600. For example, the user interface element 614 is optionally a horizontal bar or region of the user interface 600 that includes various buttons to access various functionality or operations associated with the content entry region 601, such as a button (e.g., "App 1") that is selectable to initiate a process to insert content (e.g., images, movies, music) from a content library of the electronic device into the content entry region 601, a button (e.g., "App 2") that is selectable to initiate a process to display an application store user interface of the electronic device, a button (e.g., "App 3") that is selectable to initiate a process to send or receive money to or from one or more other users/electronic devices (e.g., participants of the currently displayed messaging conversation in user interface 600), etc. In some embodiments, when text entry field 606 is empty, as it is in FIG. 6A (e.g., "Message" is displayed in the text entry field 606 to indicate to a user of device 500 that message text to be provided to the messaging conversation should be entered into text entry field 606), user interface 600 includes user interface element 614. In some embodiments, the user interface element 614 is displayed above (e.g., and adjacent to) the text keyboard 610, and the content entry region 601 is displayed above (e.g., and adjacent to) the respective user interface element 614.

In some embodiments, when device 500 detects inputs at keyboard 610 that causes content to be populated in text entry field 606, such as "oh" in FIG. 6B, device 500 replaces user interface element 614 with user interface element 616, as shown in FIG. 6B. User interface element 616 is optionally an element that includes buttons that correspond to suggested text (e.g., based on what a user of the device has already typed into a text entry field 606 or the content entry region using the text keyboard 610) and that are selectable to insert the suggested text into the content entry region and/or text entry field 606 (e.g., by replacing the user-entered text with the suggested text). For example, selection of the "word1" button in user interface element 616 optionally replaces "oh" in the text entry field 606 with "word1", selection of the "word2" button in user interface element 616 optionally replaces "oh" in the text entry field 606 with "word2", etc. In some embodiments, the user interface element 616 is displayed above (e.g., and adjacent to) the text keyboard 610, and the content entry region 601 is displayed above (e.g., and adjacent to) the respective user interface element 616.

As shown in FIGS. 6A-6B, keyboard 610 can be used to enter text content into text entry field 606. However, in some situations, a user may wish to enter emojis into text entry field 606. In some embodiments, as shown in FIG. 6B, keyboard 610 includes a selectable option 612 that is selectable to cause device 500 to display an emoji search user interface. For example, in FIG. 6C, device 500 detects selection of option 612 (e.g., via contact 603c). In response, device 500 optionally replaces keyboard 610 and user interface element 616 (or user interface element 614, if displayed) with emoji search user interface 622, while optionally maintaining text 618 in text entry field 606, as shown in FIG. 6D. In some embodiments, emoji search user interface 622 occupies the same space in user interface 600 that did user interface element 616 (or 614) and keyboard 610. In some embodiments, emoji search user interface 622 occupies more space in user interface 600 than did user interface element 616 (or 614) and keyboard 610—in such embodiments, the display space of the content entry region 601 is optionally reduced in FIG. 6D to create space for emoji search user interface 622.

Emoji search user interface 622 optionally includes (from top to bottom) an emoji search entry field 620 and an emoji keyboard 621. In some embodiments, selection of emoji search entry field 620 initiates a process to enter text into emoji search entry field 620 to search for available emojis. In some embodiments, emoji keyboard 621 includes a matrix of selectable options 624 (e.g., 624-1, 624-2, etc.) that include representations of their corresponding emojis and/or are selectable to cause their corresponding emojis to be entered into text entry field 606. For example, selection of option 624-1 optionally causes emoji 1 to be entered into text entry field 606. In some embodiments, the matrix of emojis in the emoji keyboard is organized by category of emojis (e.g., expressions, sports, food), and category options 628 (e.g., 628-1, 628-2, etc.) are selectable to navigate the matrix of emojis to the selected category of emojis. In some embodiments, emoji keyboard 621 also include a selectable option 626 that is selectable to dismiss emoji search user interface 622, and redisplay user interface element 616 (or 614) and keyboard 610 (e.g., such as shown in FIG. 6B).

In FIG. 6D, device 500 detects selection of emoji search entry field 620 (e.g., via contact 603d). In response, device 500 optionally updates emoji search user interface 622 while maintaining display of content entry region 601 (e.g., and "oh" optionally remains in text entry field 606), as shown in FIG. 6E. In some embodiments, the display space occupied by emoji search user interface 622 remains the same between FIGS. 6D and 6E—therefore, in some embodiments, the display space of content entry region 601 remains the same between FIGS. 6D and 6E. Device 500 optionally updates emoji search user interface 622 as follows in response to detecting the input in FIG. 6D: device 500 optionally maintains the size and/or placement of emoji search entry field 620; device 500 optionally replaces the top row of the emoji options in the emoji keyboard 621 of FIG. 6D with a row 630 of suggested emojis; and device 500 optionally replaces the remainder of the emoji keyboard 621 in FIG. 6D with a text keyboard 634 for entering text into emoji search entry field 620 for searching for emojis using text searching.

The emoji options 632 in the list of suggested emojis in row 630 (e.g., option 632-1 corresponding to emoji 8, option 632-2 corresponding to emoji 4, etc.) are optionally displayed before any text input is provided to emoji search entry field 620, as shown in FIG. 6E. Further, the suggested emojis in row 630 are optionally selectable to insert corresponding emojis in text entry field 606. For example, suggested emoji option 632-1 is optionally selectable to insert emoji 8 into text entry field 606 (e.g., following "oh"). In some embodiments, row 630 of suggested emojis is horizontally scrollable in response to horizontal swipe inputs detected within row 630. In some embodiments, the suggested emojis in row 630 are selected based on emoji selection activity of users other than the user of device 500, and in some embodiments, the suggested emojis in row 630 are selected based on emoji selection activity of the user of device 500 (e.g., as described in more detail with reference to method 700).

In some embodiments, upon detecting entry of text into emoji search entry field 620, device 500 replaces the suggested emojis in row 630 with emoji search results corresponding to the entered text in emoji search entry field 620. For example, in FIG. 6F, device 500 has detected entry of text (e.g., using text keyboard 634) into emoji search entry field 620 (e.g., "Red" 638). In response, device 500 has replaced, in row 630, the suggested emojis with emojis that correspond to the search term "Red" 638—for example, the emoji options listed in row 630 are optionally red balls, red homes, red flowers, red food, etc. In response to the search input in emoji search entry field 620, device 500 optionally maintains the positions and/or display space occupied by one or more of emoji search entry field 620, row 630, and text keyboard 634. Thus, in some embodiments, the size of emoji search user interface 622 and/or content entry region 601 remain the same between FIGS. 6E and 6F. Further, with reference to FIG. 6F, the emoji search results in row 630 are optionally selectable to insert the corresponding emoji into text entry field 606. For example, emoji option 632-7 is optionally selectable to insert emoji 23 into text entry field 606.

In some embodiments, further text input directed to emoji search entry field 620 optionally further refines the emoji search results provided by device 500 (e.g., as described with reference to method 700). For example, in FIG. 6G, device 500 has received further text input for emoji search entry field 620 (e.g., via text keyboard 634) such that emoji search entry field 620 now includes the search terms "Red Car" 638. In response, device 500 has refined the emoji search results in row 630 to include emojis that correspond both to "Red" and to "Car" (e.g., to maintain red cars in the list of search results, but to remove red balls from the search results, for example). For example, in FIG. 6G, emoji options 632-8 and 632-11 remain in the list of emoji search results after the entry of "Car" in emoji search entry field 620.

In FIG. 6G, device 500 detects selection of emoji option 632-11 (e.g., via contact 603g). In response, device 500 enters emoji 18 (corresponding to emoji option 632-11) into text entry field 606 (e.g., following "oh") such that the content in text entry field 606 is now "oh" and emoji 18 618, as shown in FIG. 6H. In some embodiments, in response to the input detected in FIG. 6G, device maintains search terms 638 ("Red Car") in emoji entry search field 620, the emoji search results corresponding to the search terms 638 in row 630 (e.g., emoji 7 and emoji 18), and maintains display of text keyboard 634, as shown in FIG. 6H.

If device 500 detects a different search term in emoji search entry field 620, device 500 optionally updates the emoji search results in row 630 with search results that correspond to the new search term. For example, in FIG. 6I, device 500 has detected entry of a new search term "thumb" in emoji search entry field 620 (e.g., using keyboard 634). In response, device 500 optionally replaces the emoji search results in row 630 shown in FIG. 6H with updated search results corresponding to "thumb" while maintaining the display space used by emoji search user interface 622, as shown in FIG. 6I.

In some embodiments, a given emoji is a customizable emoji that can have multiple different colors or compositions, for example. In some embodiments, only one version (or fewer than all versions) of the customizable emoji is displayed as an emoji search result in row 630, even if multiple versions of the customizable emoji would otherwise correspond to the search term 638 in emoji search entry field 620. For example, in FIG. 6I, emoji option 632-13 optionally corresponds to a thumbs-up emoji that can be customized to have different colors. Even though the search term 638 "thumb" optionally corresponds to all colors of the thumbs-up emoji, device 500 optionally only presents one version (e.g., color) of the thumbs-up emoji in row 630 of emoji search results (e.g., corresponding to emoji option 632-13). In some embodiments, the version of the thumbs-up emoji displayed by device 500 is optionally the version last selected/entered into text entry field 606 by (e.g., the user of) device 500. If device 500 were to detect a selection of emoji option 632-13 (e.g., a tap input), device 500 would optionally insert the displayed version of the customizable emoji into text entry field 606.

In some embodiments, the customizable emoji can be customized from within the emoji search user interface 622. For example, in FIG. 6J, device 500 detects an input directed to emoji option 632-13 in the row 630 of emoji search results (e.g., a tap and hold input detected on emoji option 632-13). In response, device 500 optionally displays an emoji customization user interface element 640 corresponding to emoji 9 (the emoji corresponding to emoji option 632-13), as shown in FIG. 6K—in some embodiments, device 500 does so while maintaining display of the emoji search user interface 622 (e.g., emoji customization user interface element 640 is overlaid on emoji search user interface 622). In some embodiments, the emoji customization user interface element 640 optionally includes the default, un-customized version of the emoji (e.g., emoji option 642-1 corresponding to emoji 9-0 having, for example, the default emoji color for that emoji), and one or more customized versions of the emoji (e.g., corresponding to emojis 9-1 to 9-4 having, for example, different colors for that emoji). The emoji options in the emoji customization user interface element 640 are optionally selectable to insert the corresponding emoji into the text entry field 606. For example, in FIG. 6K, device 500 detects selection of emoji option 642-5 (e.g., via contact 603k). In response, device 500 optionally enters emoji 9-4 (corresponding to emoji option 642-5) into text entry field 606 (e.g., following "oh" and emoji 18), as shown in FIG. 6L. In some embodiments, device 500 also ceases displaying emoji customization user interface element 640, though in some embodiments, device 500 maintains display of emoji customization user interface element 640 until an input (e.g., tap) is detected outside of emoji customization user interface element 640. As shown in FIG. 6L, in some embodiments, the content of emoji search user interface 622 remains unchanged from FIGS. 6I-6L.

In some embodiments, text keyboard 634 includes a selectable option 636 to cease displaying the text keyboard 634 and return to displaying the emoji keyboard 621 (e.g., shown in FIG. 6D). For example, text keyboard 634 in FIG. 6K includes selectable option 636. In some embodiments, selectable option 636 includes the graphics/representations of one or more emojis (e.g., a smiley faces). In some embodiments, selectable option 636 is at the same location in the keyboard 634 as is the "return" key in keyboard 610 (e.g., shown in FIGS. 6A-6C). Thus, in some embodiments, the "return" key in keyboard 610 (e.g., in FIG. 6C) is replaced with selectable option 636 in text keyboard 634 (e.g., in FIG. 6K) when text keyboard 634 is displayed. In some embodiments, the appearance of selectable option 636 is different from the appearance of the "return" key (e.g., different colors, different displayed content such as emojis vs. the text "return", etc.) to indicate which of keyboard 634 and keyboard 610 is currently being displayed, and to indicated that text entered using text keyboard 634 will result in corresponding text to be entered into emoji search entry field 620 (e.g., and not into text entry field 606), whereas text entered using keyboard 610 will result in corresponding text to be entered into text entry field 606 (e.g., and not into emoji search entry field 620).

In FIG. 6L, device 500 detects selection of selectable option 636 (e.g., via contact 603l). In response, device 500 optionally ceases displaying text keyboard 634 and emoji search results in row 630, and redisplays the emoji keyboard 621, as shown in FIG. 6M. In some embodiments, the emoji search results that were shown in row 630 in FIG. 6L are replaced by keys of the emoji keyboard 621 shown in FIG. 6M. In some embodiments, the search term "thumb" 638 remains in emoji search entry field 620, as shown in FIG. 6M, so that a user of device 500 can quickly return to searching emojis from their last search position/results. For example, in FIG. 6M, device 500 detects selection of emoji search entry field 620 (e.g., via contact 603m), which includes search term "thumb" 638. In response, device 500 ceases displaying the emoji keyboard 621, maintains the search term "thumb" 638 in emoji search entry field 620, redisplays the row 630 of emoji search results corresponding to search term "thumb" 638 (e.g., the same search results that were shown in FIG. 6L), and redisplays text keyboard 634, as shown in FIG. 6N. In this way, device 500 provides for quickly returning to the user's last search state after exiting to the emoji keyboard 621 shown in FIG. 6M.

In some embodiments, in response to an input detected outside of emoji search user interface 622 (e.g., an input directed to text entry field 606, an input directed to messages/content in the content entry region 601, etc.), device 500 ceases displaying emoji search user interface 622 (e.g., regardless of the content of emoji search user interface 622), and redisplays keyboard 610 and/or user interface elements 614/616 shown in FIGS. 6A-6B, thus providing a quick and efficient way of exiting from emoji searching and/or entry operations. For example, in FIG. 6N, device 500 detects an input (e.g., tap of contact 603n) within content entry region 601 (e.g., outside of emoji search user interface 622). In response, device ceases displaying emoji search user interface 622, redisplays user interface element 616, and redisplays keyboard 610, as shown in FIG. 6O. Thus, in some embodiments, in response to the input detected in FIG. 6N, device 500 replaces: 1) emoji search results (if a search term is entered in emoji search entry field 620) and/or emoji suggestions (if a search term is not entered in emoji search entry field 620) in row 630, and/or 2) emoji search entry field 620, with user interface element 616 (or user interface element 614, if no text or content is in text entry field 606). In this way, device 500 reduces the amount of display space required to redisplay keyboard 610 and/or user interface elements 616/614, and thus increases the display space available to display the content in content entry region 601. As shown in FIG. 6O, in some embodiments, the content/emojis that had been entered into text entry field 606 up through FIG. 6N remain in text entry field 606 in FIG. 6O.

In some embodiments, in addition or alternatively to dismissing emoji search user interface 622 in response to an input detected in content entry region 601, device 500 dismisses emoji search user interface 622 in response to an input detected in text entry field 606 (e.g., a tap in text entry field 606) and/or an input corresponding to a request to enter the content in text entry field 606 into the content entry region 601. For example, in FIG. 6P, while displaying the emoji search user interface 622, device 500 detects selection of selectable option 608—an option to enter the content in text entry field 606 into content entry region 601, as previously described—such as via a tap of contact 603p on option 608. In response, as shown in FIG. 6Q, device 500 transmits the content of text entry field (e.g., "oh", emoji 18 and emoji 9-4) to the messaging conversation, and representation 644 of that content is displayed in content entry region 601. As in FIG. 6O, device 500 also ceases displaying emoji search user interface 622, redisplays user interface element 614 (e.g., because no content remains in text entry field 606, as that content was sent to the messaging conversation as described above), and redisplays keyboard 610, as shown in FIG. 6Q. Thus, in some embodiments, in response to the input detected in FIG. 6P, device 500 replaces: 1) emoji search results (if a search term is entered in emoji search entry field 620) and/or emoji suggestions (if a search term is not entered in emoji search entry field 620) in row 630, and/or 2) emoji search entry field 620, with user interface element 614 (or user interface element 616, if text or content is in text entry field 606). In this way, device 500 reduces the amount of display space required to redisplay keyboard 610 and/or user interface elements 616/614, and thus increases the display space available to display the content in content entry region 601.

FIG. 7 is a flow diagram illustrating a method 700 for providing efficient user interfaces for searching for and/or entering emojis into a user interface in accordance with some embodiments. The method 700 is optionally performed at an electronic device such as device 100, device 300, or device 500 as described above with reference to FIGS. 1A-1B, 2-3, 4A-4B and 5A-5H. Some operations in method 700 are, optionally combined and/or the order of some operations is, optionally, changed.

As described below, the method 700 provides ways in which an electronic device provides efficient user interfaces for searching for and/or entering emojis into a user interface. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device (e.g., device 500) in communication with a display generation component (e.g., touch screen 504) and one or more input devices (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the electronic device displays (708), via the display generation component, a content entry region, such as region 601 in FIG. 6D (e.g., a messaging interface that displays representations of messages in a conversation, or a text or content editing interface into which text or content (e.g., images, emojis, etc.) can be entered). In some embodiments, the content entry region is displayed with a text entry field and a selectable option (e.g., a "send" button) that is selectable to insert content that is in the text entry field into the content entry region, such as a message sent to a conversation and displayed in the messaging user interface. In some embodiments, such as embodiments in which no text entry field is displayed, content (e.g., text, emojis, images) is entered directly into the content entry region (e.g., in response to detecting input at a keyboard displayed via the display generation component) without first being entered into a text entry field to then be entered into the content entry region. In some embodiments, the electronic device also displays an emoji search user interface associated with the content entry region, such as emoji searching user interface 622 in FIG. 6D (e.g., an area displayed below the content entry region that is displayed in response to receiving a request to enter emojis into the content entry region, such as in response to selecting an emoji keyboard button displayed on a text keyboard). For example, in some embodiments, before the emoji search user interface is displayed, a text keyboard is displayed along with the content entry region (e.g., and with the respective user interface element described below). In some embodiments, text entered using the text keyboard is entered directly into the content entry region and/or entered into a text entry field for eventual insertion into the content entry region. In some embodiments, the text keyboard is displayed with an emoji keyboard button that is selectable to replace the text keyboard with the emoji search user interface while maintaining display of the content entry region (e.g., and in some embodiments, maintaining display of the respective user interface element described below). In some embodiments, before the emoji search user interface was displayed, a text keyboard and a respective user interface element were displayed. In some embodiments, when the emoji search user interface is displayed, the respective user interface element is ceased to be displayed. In some embodiments, the respective user interface element includes one or more selectable options that are selectable to perform one or more operations associated with the content entry region. For example, the respective user interface element is optionally a horizontal bar or region of the user interface that includes various buttons to access various functionality or operations associated with the content entry region, such as a button that is selectable to initiate a process to insert content (e.g., images, movies, music) from a content library of the electronic device into the content entry region, a button that is selectable to initiate a process to display an application store user interface of the electronic device, a button that is selectable to initiate a process to send or receive money to or from one or more other users/electronic devices (e.g., participants of the currently displayed messaging conversation), etc. In some embodiments, the respective user interface element is an element that includes buttons that correspond to suggested text (e.g., based on what a user of the device has already typed into a text entry field or the content entry region using the text keyboard) and that are selectable to insert the suggested text into the content entry region and/or text entry field (e.g., by replacing the user-entered text with the suggested text). In some embodiments, the respective user interface element is displayed above (e.g., and adjacent to) the text keyboard, and the content entry region is displayed above (e.g., and adjacent to) the respective user interface element.

In some embodiments, the emoji search user interface includes (704): an emoji search entry field for searching for one or more emojis for insertion into the content entry region (706), such as emoji search entry field 920 in FIG. 6D (e.g., a text entry field that is able to accept text input to cause the electronic device to initiate a process to search for emojis that correspond to the entered text, including displaying results of the search in the emoji search user interface), and one or more respective selectable options corresponding to one or more respective emojis, such as included in emoji keyboard 621 in FIG. 6D, wherein the one or more respective selectable options are selectable to initiate respective processes to insert respective emojis into the content entry region (708) (e.g., a matrix of emojis, optionally organized by category (e.g., frequently used, smileys & people, animals & nature, etc.)). In some embodiments, the emojis in the matrix of emojis are selectable to insert corresponding emojis into a text entry field (if one is displayed) for insertion into the content entry region, or selectable to insert corresponding emojis into the content entry region.

In some embodiments, the emoji search user interface is displayed at a first size (710), such as shown in FIG. 6D (e.g., the emoji search user interface is displayed at a first size via the display generation component). In some embodiments, the emoji search user interface is displayed in a lower region of the entire display area, and the content entry region is displayed above the emoji search user interface in the display area. In some embodiments, the content entry region is displayed at a second size. In some embodiments, while displaying the content entry region and the emoji search user interface, the electronic device receives (712), via the one or more input devices, an input corresponding to a request to search for one or more emojis, such as detection of contact 603*d* in emoji search entry field 620 in FIG. 6D (e.g., an input directed to the emoji search entry field, such as a tap input detected in the emoji search entry field). In some embodiments, in response to receiving the input corresponding to the request to search for one or more emojis (714), the electronic device maintains (716) the emoji search entry field in the emoji search user interface, such as in FIG. 6E (e.g., the emoji search entry field remains in the emoji search user interface). In some embodiments, the emoji search entry field remains displayed at the same location in the emoji search user interface, and in some embodiments, the emoji search entry field changes location in the emoji search user interface. In some embodiments, the emoji search entry field remains displayed at the same size in the emoji search user interface. In some embodiments, in response to receiving the input corresponding to the request to search for one or more emojis, the electronic device replaces (718), in the emoji search user interface, the one or more respective selectable options corresponding to the one or more respective emojis with a keyboard for entering text into the emoji search entry field, such as in FIG. 6E (e.g., the emojis organized by category are replaced by a text keyboard (e.g., the same keyboard that was displayed before the emoji search user interface was displayed)). The text keyboard was optionally not displayed when the input corresponding to the request to search emojis was received. In some embodiments, text entered using the text keyboard is entered into the emoji search entry field (e.g., not the content entry region or text entry field, if displayed), which optionally initiates a process to search for emojis based on the entered text.

In some embodiments, in response to receiving the input corresponding to the request to search for one or more emojis, the electronic device displays (720), in the emoji search user interface, a list of suggested emojis, such as in row 630 in FIG. 6E (e.g., in response to detecting the input directed to the emoji search entry field, and before text is entered into the emoji search entry field, the electronic device displays a list (e.g., a scrollable row) of one or more suggested emojis below the emoji search entry field and above the text keyboard). In some embodiments, the emojis in the list of suggested emojis are selectable to insert the corresponding emoji into a text entry field (e.g., if displayed) to be entered into the content entry region, or to insert the corresponding emoji directly into the content entry region (e.g., while maintaining display of the list of suggested emojis, the keyboard for entering text into the emoji search entry field, and the emoji search entry field).

In some embodiments, the emoji search user interface is displayed at a size less than or equal to the first size (722), such as in FIG. 6E, where the size of emoji searching user interface 622 is the same (or less than) the size of emoji searching user interface 622 in FIG. 6D. In some embodiments, after the input directed to the emoji search entry field, the total display area occupied by the emoji search user interface is less than or equal to the total display area occupied by the emoji search user interface before the input directed to the emoji search entry field was detected. In some embodiments, the content entry region remains displayed at the second size, or greater than the second size. In some embodiments, before the emoji search user interface is displayed, the respective user interface element, a text keyboard (e.g., including a button selectable to display the search user interface), and the content entry region are displayed (e.g., with or without a text entry field for entering content into the content entry region), and the respective user interface element and the text keyboard together are also displayed at the first size (or in some embodiments, smaller than the first size). In some embodiments, while displaying the content entry region and/or text entry field and the emoji search user interface (e.g., any state of the emoji search user interface), input directed to the content entry region and/or the text entry field (e.g., a tap input detected in the content entry region or the text entry field) causes the device to cease displaying the emoji search user interface and display a text keyboard for entering text into the content entry region and/or the text entry field. The above-described manner of maintaining the display size of the emoji search user interface with respect to the content entry region ensures that emoji search inputs detected by the device do not interfere with content displayed in the content entry region, which simplifies the interaction between the user and the electronic device and enhances the operability of the electronic device and makes the user-device interface more efficient (e.g., maintaining consistency of the user interface to reduce erroneous inputs provided by a user), which additionally reduces power usage and improves battery life of the electronic device by enabling the user to use the electronic device more quickly and efficiency while reducing errors in the usage of the device.

In some embodiments, before detecting input directed to the emoji search entry field displayed with the list of suggested emojis, in accordance with a determination that emoji selection activity of a user of the electronic device satisfies one or more criteria (e.g., the user of the electronic device has previously selected/entered/searched for more than a threshold number of emojis, or has otherwise interacted with the same or different emojis more than a threshold number of times), the list of suggested emojis includes a first set of suggested emojis selected based on the emoji selection activity of the user, such as emojis in row 630 in FIG. 6E (e.g., without the user having to enter any search entries into the emoji search entry field, the electronic device displays recommended or suggested emojis that are selectable to input the selected emojis into the text entry field and/or content entry region). In some embodiments, if the user has sufficient emoji activity, the suggested list of emojis is personalized to the user (e.g., the list of emojis are the most used emojis by the user of the electronic device, displayed in order of number of times they have been selected). In some embodiments, the list of suggested emojis does not include any emojis selected based on other users' emoji selection activity.

In some embodiments, in accordance with a determination that the emoji selection activity of the user does not satisfy the one or more criteria (e.g., the user of the electronic device has previously selected/entered/searched for less than a threshold number of emojis, or has otherwise interacted with the same or different emojis less than a threshold number of times), the list of suggested emojis does not include the first set of suggested emojis and includes a second set of suggested emojis selected based on emoji selection activity of users other than the user of the electronic device. For example, in some embodiments, if the user has insufficient emoji activity, the suggested list of emojis is not personalized to the user (e.g., the list of emojis are the most used emojis by other users, other than the user of the electronic device, displayed in order of number of times they have been selected by those other users). The above-described manner of displaying suggested emojis provides a quick and efficient manner of displaying emojis likely to be most relevant independent of emoji activity of the user of the electronic device, which simplifies the interaction between the user and the electronic device and enhances the operability of the electronic device and makes the user-device interface more efficient (e.g., by reducing the number of inputs needed to select/insert emojis), which additionally reduces power usage and improves battery life of the electronic device by enabling the user to use the electronic device more quickly and efficiency while reducing errors in the usage of the device.

In some embodiments, while displaying the emoji search user interface at less than or equal to the first size, the emoji search user interface including the emoji search entry field and the list of suggested emojis, such as in FIG. 6F, the electronic device receives, via the one or more input devices, an input that populates the emoji search entry field with a search entry, such as the entry of search term "Red" 638 in FIG. 6F (e.g., input detected on the keyboard that enters text into the emoji search entry field, such as entry of the word "ball" or "red"). In some embodiments, in response to receiving the input that populates the emoji search entry field with the search, the electronic device replaces the list of suggested emojis with one or more search result emojis that correspond to the search entry, such as shown in FIG. 6F, while maintaining the emoji search user interface at less than or equal to the first size, such as shown in FIG. 6F. For example, in response to entry of the word "ball" in the emoji search entry field, the electronic device replaces the initially suggested emojis with emojis corresponding to the entered search term "ball" (e.g., various sports ball emojis). In some embodiments, the search result emojis are selectable to insert the selected emoji into a text entry field and/or content entry region (e.g., while maintaining display of the list of search result emojis, the keyboard for entering text into the emoji search entry field, and the emoji search entry field). In some embodiments, selecting for insertion a search result emoji maintains, in the emoji search entry field, the search term(s) that were previously entered to cause display of the search result emojis, and maintains display of the search result emojis. In some embodiments, the initial suggested list of emojis is one row of emojis, and the search result emojis are also one row of emojis. Therefore, in some embodiments, searching for emojis does not increase the display area consumed by the emoji search user interface, as the display area occupied by the initial suggested list of emojis and the search result list of emojis is the same. In some embodiments, the search results are ordered (e.g., from left to right) from the top search result to the lowest search result. In some embodiments, the search results are organized by category (e.g., the top result from a first category of emojis (e.g., sports) followed by the top result from a second category of emojis (e.g., food) followed by a second result from the first category followed by a second result from the second category, etc.). In some embodiments, the algorithm used for searching the emojis is based on term frequency—inverse document frequency. In some embodiments, the algorithm used for searching the emojis supports phrase searching (e.g., searching for a phrase, such as "ball" returning search results of sports balls, and "red ball" retuning search results of red sports balls). In some embodiments, the algorithm used for searching supports multiple languages, including the currently active language(s) selected for the text keyboard, such that even if the currently active language for the text keyboard is a first language, a user is able to provide entry to the emoji search entry field in a second language, different from the first language, and the device provides the correct emoji search results for that entered search terms in the second language. In some embodiments, the ordering of the search results is different depending on the user's (e.g., user of the electronic device) past emoji selection activity. For example, if a user has previously selected emojis of dancers more frequently than emojis of sports balls, a search for "ball" optionally results in the top search results being emojis of people/dancers in gowns (e.g., for a ball) and lesser search result being emojis of sports balls—and vice versa. In some embodiments, the emojis are searchable by one or more of color, expression (e.g., happy, sad) or description (e.g., ball, house). The above-described manner of replacing the initial suggested list of emojis with the search result emojis ensures that emoji search inputs do not interfere with content displayed in the content entry region, which simplifies the interaction between the user and the electronic device and enhances the operability of the electronic device and makes the user-device interface more efficient (e.g., maintaining consistency of the user interface to reduce erroneous inputs provided by a user), which additionally reduces power usage and improves battery life of the electronic device by enabling the user to use the electronic device more quickly and efficiency while reducing errors in the usage of the device.

In some embodiments, the one or more search result emojis include a respective emoji that corresponds to a first customized version of the respective emoji and a second customized version of the respective emoji, such as emoji 9 (corresponding to emoji option 632-13) in FIG. 6I (e.g., an emoji that has customizable colors (e.g., a red version of the emoji, a green version of the emoji, etc.) and/or customizable parts (e.g., a compound emoji that has a first part that can be customized and a second part that can be customized)). In some embodiments, the first customized version of the emoji is the emoji having a first color and/or composition, and the second customized version of the emoji is the emoji having a second color and/or composition. In some embodiments, the one or more search result emojis include, in accordance with a determination that one or more first criteria are satisfied, the first customized version of the respective emoji without including the second customized version of the respective emoji (e.g., for example, if the user of the electronic device last used (e.g., entered into a content entry region) the first customized version of the respective emoji, the search results include the first customized version and not the second customized version), and in accordance with a determination that one or more second criteria are satisfied, the second customized version of the respective emoji without including the first customized version of the respective emoji. For example, if the user of the electronic device last used (e.g., entered into a content entry region) the second customized version of the respective emoji, the search results include the second customized version and not the first customized version. Thus, in some embodiments, the search results only ever include a single version of a customizable emoji, even if multiple customized versions of that emoji would satisfy the search query. In some embodiments, an input (e.g., selection longer than a time threshold) directed to the single displayed version of the customizable emoji causes display of a user interface element for selecting a different customized version of the customizable emoji for entry into a text entry field and/or content entry region. In some embodiments, an input (e.g., selection shorter than the time threshold) directed to the single displayed version of the customizable emoji inserts the displayed version of the customized emoji into a text entry field and/or content entry region. The above-described manner of displaying some but not other versions of a customizable emoji in the emoji search results ensures that display area consumed by the customizable emoji is reduced, which simplifies the interaction between the user and the electronic device and enhances the operability of the electronic device and makes the user-device interface more efficient (e.g., maintaining the ability to display as many search results as possible without increasing the display area required to do so), which additionally reduces power usage and improves battery life of the electronic device by enabling the user to use the electronic device more quickly and efficiency while reducing errors in the usage of the device.

In some embodiments, before receiving the input corresponding to the request to search for the one or more emojis, the content entry region is displayed at a second size, such as in FIG. 6D, and in response to receiving the input corresponding to the request to search for the one or more emojis, the content entry region is displayed at greater than or equal to the second size, such as in FIG. 6E. Thus, in some embodiments, the input directed to the emoji search entry field do not cause a reduction in the available display area for displaying the content in the content entry region. In some embodiments, the content entry region remains displayed at the same size as it was before the input. The above-described manner of maintaining the display size of the content entry region ensures that emoji search inputs detected by the device do not interfere with content displayed in the content entry region, which simplifies the interaction between the user and the electronic device and enhances the operability of the electronic device and makes the user-device interface more efficient (e.g., maintaining consistency of the user interface to reduce erroneous inputs provided by a user), which additionally reduces power usage and improves battery life of the electronic device by enabling the user to use the electronic device more quickly and efficiency while reducing errors in the usage of the device.

In some embodiments, before displaying the content entry region and the emoji search user interface, the content entry region was displayed with: 1) a text keyboard for entering text into the content entry region, such as keyboard 610 in FIG. 6B, and 2) a respective user interface element that includes one or more selectable options that are selectable to perform one or more operations associated with the content entry region, such as element 614 in FIG. 6A or element 616 in FIG. 6B. For example, the respective user interface element is optionally a horizontal bar or region of the user interface that includes various buttons to access various functionality or operations associated with the content entry region, such as a button that is selectable to initiate a process to insert content (e.g., images, movies, music) from a content library of the electronic device into the content entry region, a button that is selectable to initiate a process to display an application store user interface of the electronic device, a button that is selectable to initiate a process to send or receive money to or from one or more other users/electronic devices (e.g., participants of the currently displayed messaging conversation), etc. In some embodiments, the respective user interface element is an element that includes buttons that correspond to suggested text (e.g., based on what a user of the device has already typed into a text entry field or the content entry region using the text keyboard) and that are selectable to insert the suggested text into the content entry region and/or text entry field (e.g., by replacing the user-entered text with the suggested text). In some embodiments, the respective user interface element is displayed above (e.g., and adjacent to) the text keyboard, and the content entry region is displayed above (e.g., and adjacent to) the respective user interface element.

In some embodiments, the content entry region and the emoji search user interface were displayed in response to an input corresponding to a request to display the emoji search user interface detected while the content entry region, the text keyboard and the respective user interface element were displayed, such as selection of option 612 in FIG. 6C (e.g., selection of a selectable option displayed in or with the text keyboard for displaying the emoji search user interface). In some embodiments, displaying the emoji search user interface includes ceasing display of the text keyboard and the respective user interface element, such as ceasing to display keyboard 610 and user interface element 616 from FIG. 6C to FIG. 6D. In some embodiments, the respective user interface element is replaced (at least partially) by the emoji search entry field in the emoji search user interface. In some embodiments, the text keyboard is replaced (at least partially) by the one or more respective selectable options corresponding to one or more respective emojis in the emoji search user interface. The above-described manner of ceasing to display the respective user interface element reduces or eliminates an amount by which the display area of the content entry region is reduced in response to displaying the emoji search user interface, which simplifies the interaction between the user and the electronic device and enhances the operability of the electronic device and makes the user-device interface more efficient (e.g., by maintaining the amount of content that can be displayed in the content entry region), which additionally reduces power usage and improves battery life of the electronic device by enabling the user to use the electronic device more quickly and efficiency while reducing errors in the usage of the device.

In some embodiments, before displaying the content entry region and the emoji search user interface, the content entry region was displayed with a text keyboard for entering text into the content entry region, the text keyboard including a first respective selectable option displayed at a first location in the text keyboard, the first respective selectable option selectable to perform a first operation, such as the "return" key in keyboard 610 in FIG. 6C (e.g., the text keyboard optionally includes an "enter" or "return" button that is selectable to move a text insertion cursor (e.g., in a text entry field or in the content entry region) from one line to a next line of text), and the keyboard for entering text into the search entry field that is displayed in the emoji search user interface includes a second respective selectable option displayed at the first location in the keyboard for entering text into the search entry field, the second respective selectable option selectable to perform a second operation, different from the first operation, such as option 636 in FIG. 6K. For example, the text keyboard displayed during emoji searching optionally does not include an "enter" or "return" button. Instead, in some embodiments, the button at the location of the "enter" button is a respective button that is selectable to revert to displaying categories of emojis in the emoji search user interface (e.g., instead of displaying the text keyboard for searching emojis). In some embodiments, the respective button is a different color than the "enter" button. In some embodiments, the respective button is displayed with different text and/or includes different visual indications than the "enter" button. In some embodiments, the "enter" button includes the text "enter" or "return". In some embodiments, the respective button includes visual representations of one or more emojis (without including the text "enter" or "return"). The above-described manner of including different selectable options in the emoji search text keyboard vs. the regular text keyboard provides quick and efficient indication that the displayed keyboard is for searching emojis rather than entering text into the content entry region, which simplifies the interaction between the user and the electronic device and enhances the operability of the electronic device and makes the user-device interface more efficient (e.g., maintaining consistency of the user interface to reduce erroneous inputs provided by a user), which additionally reduces power usage and improves battery life of the electronic device by enabling the user to use the electronic device more quickly and efficiency while reducing errors in the usage of the device.

In some embodiments, while displaying the emoji search user interface that includes a first search entry in the emoji search entry field (e.g., "ball" entered into the emoji search entry field), and one or more search result emojis (e.g., the results of the emoji search for "ball"), the electronic device receives, via the one or more input devices, an input corresponding to a request to redisplay, in the emoji search user interface, the one or more respective selectable options corresponding to one or more respective emojis, such as selection of option 636 in FIG. 6L (e.g., selection of the second respective selectable option displayed at the first location in the keyboard for entering text into the search entry field that was previously described). In some embodiments, in response receiving the input corresponding to the request to redisplay the one or more respective selectable options corresponding to one or more respective emojis, the electronic device updates the emoji search user interface to cease displaying the keyboard and redisplay the one or more respective selectable options corresponding to one or more respective emojis, such as shown in FIG. 6M, wherein the updated emoji search user interface includes the emoji search entry field that includes the first search entry, such as in FIG. 6M where search term "thumb" 638 remains in emoji search entry field 620. For example, in some embodiments, returning to the emoji categories view of the emoji search user interface maintains any search terms that had previously been entered into the emoji search entry field. In some embodiments, returning to the emoji categories view of the emoji search user interface clears (does not maintain) any search terms that had previously been entered into the emoji search entry field. In embodiments in which the search terms in the emoji search entry field have been maintained, redisplaying the view of the emoji search user interface that includes the text keyboard for entering text into the emoji search entry field causes the text keyboard and the search result emojis to be redisplayed, where the search result emojis correspond to the maintained search term in the emoji search entry field (which is optionally also maintained). The above-described manner of maintaining previously entered search terms in the emoji search entry field provides a quick and efficient manner of switching back and forth between searching for specific emojis using search terms and searching for emojis by category, which simplifies the interaction between the user and the electronic device and enhances the operability of the electronic device and makes the user-device interface more efficient (e.g., by reducing the number of inputs needed for a user to return to their previous emoji search state), which additionally reduces power usage and improves battery life of the electronic device by enabling the user to use the electronic device more quickly and efficiency while reducing errors in the usage of the device.

It should be understood that the particular order in which the operations in method 700 and/or FIG. 7 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 7 are, optionally, implemented by components depicted in FIGS. 1A-1B. For example, displaying operations 702 and 720, and receiving operation 712, are optionally implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology potentially involves the gathering and use of data available from specific and legitimate sources to facilitate emoji searching. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information, usage history, handwriting styles, etc.

The present disclosure recognizes that the use of such personal information data, in the present technology, can be used to the benefit of users. For example, the personal information data can be used to automatically suggest emojis for selection that are personalized to the user of the electronic device. Accordingly, use of such personal information data enables users to enter fewer inputs to perform an action with respect to searching for and/or entering emojis. Further, other uses for personal information data that benefit the user are also contemplated by the present disclosure. For instance, user location data may be used to identify relevant emojis to display to a user.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the user is able to configure one or more electronic devices to change the discovery or privacy settings of the electronic device. For example, the user can select a setting that only allows an electronic device to access certain of the user's location data and/or emoji selection history when facilitating emoji searching as described herein.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location data can be recognized based on aggregated non-personal information data or a bare minimum amount of personal information, such as the location information being handled only on the user's device, or other non-personal information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device in communication with a display generation component and one or more input devices:
displaying, via the display generation component, a content entry region, and an emoji search user interface associated with the content entry region, wherein:
the emoji search user interface includes:
an emoji search entry field for searching for one or more emojis for insertion into the content entry region; and
one or more respective selectable options corresponding to one or more respective emojis, wherein the one or more respective selectable options are selectable to initiate respective processes to insert the one or more respective emojis into the content entry region, and
the emoji search user interface is displayed at a first size;
while displaying the content entry region and the emoji search user interface, receiving, via the one or more input devices, an input corresponding to a request to search for one or more emojis via the emoji search entry field;
in response to receiving the input corresponding to the request to search for one or more emojis via the emoji search entry field:
maintaining the emoji search entry field in the emoji search user interface;
replacing, in the emoji search user interface, the one or more respective selectable options corresponding to the one or more respective emojis with a keyboard for entering text into the emoji search entry field; and
displaying, in the emoji search user interface, a list of suggested emojis, wherein the emoji search user interface is displayed at a size less than or equal to the first size;
while displaying the emoji search user interface at less than or equal to the first size, the emoji search user interface including the emoji search entry field and the list of suggested emojis, receiving, via the one or more input devices, an input that populates the emoji search entry field with a search entry; and
in response to receiving the input that populates the emoji search entry field with the search entry, replacing the list of suggested emojis with one or more search result emojis that correspond to the search entry while maintaining the emoji search user interface at less than or equal to the first size, wherein the one or more search result emojis include:
in accordance with a determination that one or more first criteria are satisfied, a first customized version of a respective emoji without including a second customized version of the respective emoji; and
in accordance with a determination that one or more second criteria are satisfied, the second customized version of the respective emoji without including the first customized version of the respective emoji.

2. The method of claim 1, wherein before receiving the input corresponding to the request to search for one or more emojis via the emoji search entry field:
in accordance with a determination that emoji selection activity of a user of the electronic device satisfies one or more third criteria, the list of suggested emojis includes a first set of suggested emojis selected based on the emoji selection activity of the user, and in accordance with a determination that the emoji selection activity of the user does not satisfy the one or more third criteria, the list of suggested emojis does not include the first set of suggested emojis and includes a second set of suggested emojis selected based on emoji selection activity of users other than the user of the electronic device.

3. The method of claim 1, wherein before receiving the input corresponding to the request to search for one or more emojis via the emoji search entry field, the content entry region is displayed at a second size, and in response to receiving the input corresponding to the request to search for one or more emojis via the emoji search entry field, the content entry region is displayed at greater than or equal to the second size.

4. The method of claim 1, wherein:

before displaying the content entry region and the emoji search user interface, the content entry region was displayed with: 1) a text keyboard for entering text into the content entry region and 2) a respective user interface element that includes one or more selectable options that are selectable to perform one or more operations associated with the content entry region, the content entry region and the emoji search user interface were displayed in response to an input corresponding to a request to display the emoji search user interface detected while the content entry region, the text keyboard for entering text into the content entry region and the respective user interface element were displayed, and displaying the emoji search user interface includes ceasing display of the text keyboard for entering text into the content entry region and the respective user interface element.

5. The method of claim 1, wherein:

before displaying the content entry region and the emoji search user interface, the content entry region was displayed with a text keyboard for entering text into the content entry region, the text keyboard for entering text into the content entry region including a first respective selectable option displayed at a first location in the text keyboard for entering text into the content entry region, the first respective selectable option selectable to perform a first operation, and the keyboard for entering text into the emoji search entry field that is displayed in the emoji search user interface includes a second respective selectable option displayed at the first location in the keyboard for entering text into the emoji search entry field, the second respective selectable option selectable to perform a second operation, different from the first operation.

6. The method of claim 1, further comprising: while displaying the emoji search user interface that includes a first search entry in the emoji search entry field, and the one or more search result emojis, receiving, via the one or more input devices, an input corresponding to a request to redisplay, in the emoji search user interface, the one or more respective selectable options corresponding to one or more respective emojis; and in response receiving the input corresponding to the request to redisplay the one or more respective selectable options corresponding to one or more respective emojis, updating the emoji search user interface to cease displaying the keyboard for entering text into the emoji search entry field and redisplay the one or more respective selectable options corresponding to one or more respective emojis, wherein the updated emoji search user interface includes the emoji search entry field that includes the first search entry.

7. An electronic device, comprising:

one or more processors;

memory; and one or more programs, wherein the one or more programs are stored in the memory and configured to be executed by the one or more processors, the one or more programs including instructions for:

displaying, via a display generation component, a content entry region, and an emoji search user interface associated with the content entry region, wherein:

the emoji search user interface includes:

an emoji search entry field for searching for one or more emojis for insertion into the content entry region; and one or more respective selectable options corresponding to one or more respective emojis, wherein the one or more respective selectable options are selectable to initiate respective processes to insert the one or more respective emojis into the content entry region, and the emoji search user interface is displayed at a first size;

while displaying the content entry region and the emoji search user interface, receiving, via one or more input devices, an input corresponding to a request to search for one or more emojis via the emoji search entry field;

in response to receiving the input corresponding to the request to search for one or more emojis via the emoji search entry field:

maintaining the emoji search entry field in the emoji search user interface;

replacing, in the emoji search user interface, the one or more respective selectable options corresponding to the one or more respective emojis with a keyboard for entering text into the emoji search entry field; and displaying, in the emoji search user interface, a list of suggested emojis, wherein the emoji search user interface is displayed at a size less than or equal to the first size;

while displaying the emoji search user interface at less than or equal to the first size, the emoji search user interface including the emoji search entry field and the list of suggested emojis, receiving, via the one or more input devices, an input that populates the emoji search entry field with a search entry; and in response to receiving the input that populates the emoji search entry field with the search entry, replacing the list of suggested emojis with one or more search result emojis that correspond to the search entry while maintaining the emoji search user interface at less than or equal to the first size, wherein the one or more search result emojis include:

in accordance with a determination that one or more first criteria are satisfied, a first customized version of a respective emoji without including a second customized version of the respective emoji; and in accordance with a determination that one or more second criteria are satisfied, the second customized version of the respective emoji without including the first customized version of the respective emoji.

8. The electronic device of claim 7, wherein before receiving the input corresponding to the request to search for one or more emojis via the emoji search entry field:
in accordance with a determination that emoji selection activity of a user of the electronic device satisfies one or more third criteria, the list of suggested emojis includes a first set of suggested emojis selected based on the emoji selection activity of the user, and
in accordance with a determination that the emoji selection activity of the user does not satisfy the one or more third criteria, the list of suggested emojis does not include the first set of suggested emojis and includes a second set of suggested emojis selected based on emoji selection activity of users other than the user of the electronic device.

9. The electronic device of claim 7, wherein before receiving the input corresponding to the request to search for one or more emojis via the emoji search entry field, the content entry region is displayed at a second size, and in response to receiving the input corresponding to the request to search for one or more emojis via the emoji search entry field, the content entry region is displayed at greater than or equal to the second size.

10. The electronic device of claim 7, wherein:
before displaying the content entry region and the emoji search user interface, the content entry region was displayed with: 1) a text keyboard for entering text into the content entry region and 2) a respective user interface element that includes one or more selectable options that are selectable to perform one or more operations associated with the content entry region,
the content entry region and the emoji search user interface were displayed in response to an input corresponding to a request to display the emoji search user interface detected while the content entry region, the text keyboard for entering text into the content entry region and the respective user interface element were displayed, and
displaying the emoji search user interface includes ceasing display of the text keyboard for entering text into the content entry region and the respective user interface element.

11. The electronic device of claim 7, wherein:
before displaying the content entry region and the emoji search user interface, the content entry region was displayed with a text keyboard for entering text into the content entry region, the text keyboard for entering text into the content entry region including a first respective selectable option displayed at a first location in the text keyboard for entering text into the content entry region, the first respective selectable option selectable to perform a first operation, and
the keyboard for entering text into the emoji search entry field that is displayed in the emoji search user interface includes a second respective selectable option displayed at the first location in the keyboard for entering text into the emoji search entry field, the second respective selectable option selectable to perform a second operation, different from the first operation.

12. The electronic device of claim 7, wherein the one or more programs include instructions for:
while displaying the emoji search user interface that includes a first search entry in the emoji search entry field, and the one or more search result emojis, receiving, via the one or more input devices, an input corresponding to a request to redisplay, in the emoji search user interface, the one or more respective selectable options corresponding to one or more respective emojis; and
in response receiving the input corresponding to the request to redisplay the one or more respective selectable options corresponding to one or more respective emojis, updating the emoji search user interface to cease displaying the keyboard for entering text into the emoji search entry field and redisplay the one or more respective selectable options corresponding to one or more respective emojis, wherein the updated emoji search user interface includes the emoji search entry field that includes the first search entry.

13. A non-transitory computer readable storage medium storing one or more programs, the one or more programs comprising instructions, which when executed by one or more processors of an electronic device, cause the electronic device to perform a method comprising:
displaying, via a display generation component, a content entry region, and an emoji search user interface associated with the content entry region, wherein:
the emoji search user interface includes:
an emoji search entry field for searching for one or more emojis for insertion into the content entry region; and
one or more respective selectable options corresponding to one or more respective emojis, wherein the one or more respective selectable options are selectable to initiate respective processes to insert the one or more respective emojis into the content entry region, and
the emoji search user interface is displayed at a first size;
while displaying the content entry region and the emoji search user interface, receiving, via one or more input devices, an input corresponding to a request to search for one or more emojis via the emoji search entry field;
in response to receiving the input corresponding to the request to search for one or more emojis via the emoji search entry field:
maintaining the emoji search entry field in the emoji search user interface;
replacing, in the emoji search user interface, the one or more respective selectable options corresponding to the one or more respective emojis with a keyboard for entering text into the emoji search entry field; and
displaying, in the emoji search user interface, a list of suggested emojis, wherein the emoji search user interface is displayed at a size less than or equal to the first size;
while displaying the emoji search user interface at less than or equal to the first size, the emoji search user interface including the emoji search entry field and the list of suggested emojis, receiving, via the one or more input devices, an input that populates the emoji search entry field with a search entry; and
in response to receiving the input that populates the emoji search entry field with the search entry, replacing the list of suggested emojis with one or more search result emojis that correspond to the search entry while maintaining the emoji search user interface at less than or equal to the first size, wherein the one or more search result emojis include:
in accordance with a determination that one or more first criteria are satisfied, a first customized version of a respective emoji without including a second customized version of the respective emoji; and in accordance with a determination that one or more second criteria are satisfied, the second customized version of the respective emoji without including the first customized version of the respective emoji.

14. The non-transitory computer readable storage medium of claim 13, wherein before receiving the input corresponding to the request to search for one or more emojis via the emoji search entry field:

in accordance with a determination that emoji selection activity of a user of the electronic device satisfies one or more third criteria, the list of suggested emojis includes a first set of suggested emojis selected based on the emoji selection activity of the user, and in accordance with a determination that the emoji selection activity of the user does not satisfy the one or more third criteria, the list of suggested emojis does not include the first set of suggested emojis and includes a second set of suggested emojis selected based on emoji selection activity of users other than the user of the electronic device.

15. The non-transitory computer readable storage medium of claim 13, wherein before receiving the input corresponding to the request to search for one or more emojis via the emoji search entry field, the content entry region is displayed at a second size, and in response to receiving the input corresponding to the request to search for one or more emojis via the emoji search entry field, the content entry region is displayed at greater than or equal to the second size.

16. The non-transitory computer readable storage medium of claim 13, wherein:

before displaying the content entry region and the emoji search user interface, the content entry region was displayed with: 1) a text keyboard for entering text into the content entry region and 2) a respective user interface element that includes one or more selectable options that are selectable to perform one or more operations associated with the content entry region, the content entry region and the emoji search user interface were displayed in response to an input corresponding to a request to display the emoji search user interface detected while the content entry region, the text keyboard for entering text into the content entry region and the respective user interface element were displayed, and displaying the emoji search user interface includes ceasing display of the text keyboard for entering text into the content entry region and the respective user interface element.

17. The non-transitory computer readable storage medium of claim 13, wherein:

before displaying the content entry region and the emoji search user interface, the content entry region was displayed with a text keyboard for entering text into the content entry region, the text keyboard for entering text into the content entry region including a first respective selectable option displayed at a first location in the text keyboard for entering text into the content entry region, the first respective selectable option selectable to perform a first operation, and the keyboard for entering text into the emoji search entry field that is displayed in the emoji search user interface includes a second respective selectable option displayed at the first location in the keyboard for entering text into the emoji search entry field, the second respective selectable option selectable to perform a second operation, different from the first operation.

18. The non-transitory computer readable storage medium of claim 13, wherein the instructions, when executed by the one or more processors of the electronic device, cause the electronic device to perform the method comprising:

while displaying the emoji search user interface that includes a first search entry in the emoji search entry field, and the one or more search result emojis, receiving, via the one or more input devices, an input corresponding to a request to redisplay, in the emoji search user interface, the one or more respective selectable options corresponding to one or more respective emojis; and in response receiving the input corresponding to the request to redisplay the one or more respective selectable options corresponding to one or more respective emojis, updating the emoji search user interface to cease displaying the keyboard for entering text into the emoji search entry field and redisplay the one or more respective selectable options corresponding to one or more respective emojis, wherein the updated emoji search user interface includes the emoji search entry field that includes the first search entry.

\* \* \* \* \*